US008917050B2

(12) United States Patent
Kimpara et al.

(10) Patent No.: US 8,917,050 B2
(45) Date of Patent: Dec. 23, 2014

(54) POWER INVERTER AND ELECTRIC POWER STEERING CONTROLLER

(75) Inventors: Yoshihiko Kimpara, Tokyo (JP); Takayuki Kifuku, Tokyo (JP); Tatsuya Mori, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 599 days.

(21) Appl. No.: 13/184,018

(22) Filed: Jul. 15, 2011

(65) Prior Publication Data

US 2012/0206075 A1 Aug. 16, 2012

(30) Foreign Application Priority Data

Feb. 16, 2011 (JP) ................. 2011-030717

(51) Int. Cl.
| H02P 27/04 | (2006.01) |
| B62D 5/04 | (2006.01) |
| H02M 7/5387 | (2007.01) |
| H02P 21/00 | (2006.01) |
| H02P 21/04 | (2006.01) |
| H02P 21/05 | (2006.01) |
| H02M 1/00 | (2006.01) |

(52) U.S. Cl.
CPC ......... *B62D 5/0424* (2013.01); *H02M 7/53875* (2013.01); *H02P 21/0096* (2013.01); *H02P 21/04* (2013.01); *H02P 21/05* (2013.01); *H02M 2001/0025* (2013.01)
USPC .................. 318/800; 318/801; 318/400.26

(58) Field of Classification Search
USPC ............ 318/599, 811, 400.6, 400.17, 400.26, 318/800, 801, 400.06
See application file for complete search history.

(56) References Cited

U.S. PATENT DOCUMENTS

| 4,772,996 A | 9/1988 | Hanei et al. | |
| 5,107,438 A * | 4/1992 | Sato | 702/107 |
| 5,610,806 A | 3/1997 | Blasko et al. | |
| 5,627,742 A * | 5/1997 | Nakata et al. | 363/98 |

(Continued)

FOREIGN PATENT DOCUMENTS

| DE | 10 2007 021 368 B4 | 8/2008 |
| DE | 10 2008 054 744 A1 | 6/2010 |

(Continued)

OTHER PUBLICATIONS

German Office Action dated Aug. 3, 2012 issued in German Patent Application No. 10 2011 080 334.3.

(Continued)

*Primary Examiner* — Rina Duda
(74) *Attorney, Agent, or Firm* — Sughrue Mion, PLLC; Richard C. Turner

(57) ABSTRACT

A power inverter is provided that can apply to an AC rotary machine three-phase voltages of high amplitudes and low distortion while suppressing ohmic loss attributed to current detection resisters. The power inverter includes a superimposed voltage command computing device which is configured to compute and output a superimposed voltage command depending on the difference between a maximum value and a minimum value of three-phase voltage commands; a voltage command modification device which is configured to add the superimposed voltage command to each of the three-phase voltage commands and outputting modified three-phase voltage commands; and a power output device which is configure to output the three-phase voltages based on the modified three-phase voltage commands.

15 Claims, 12 Drawing Sheets

(56) References Cited

U.S. PATENT DOCUMENTS

| | | | |
|---|---|---|---|
| 5,706,186 A | 1/1998 | Blasko | |
| 6,043,624 A * | 3/2000 | Masaki et al. | 318/723 |
| 6,259,611 B1 * | 7/2001 | Ito et al. | 363/41 |
| 7,157,876 B2 * | 1/2007 | Ide et al. | 318/400.04 |
| 7,166,975 B2 * | 1/2007 | Mori et al. | 318/400.36 |
| 2002/0131285 A1 | 9/2002 | Kawakami | |
| 2009/0052215 A1 | 2/2009 | Watanabe | |
| 2010/0194319 A1 * | 8/2010 | Ito et al. | 318/400.13 |
| 2010/0259207 A1 * | 10/2010 | Kitanaka | 318/400.17 |
| 2011/0292700 A1 | 12/2011 | Arakawa et al. | |
| 2012/0033470 A1 | 2/2012 | Muneshima et al. | |

FOREIGN PATENT DOCUMENTS

| | | | |
|---|---|---|---|
| EP | 0 585 703 A2 | 3/1994 | |
| JP | 63-080774 A | 4/1988 | |
| JP | 6-205589 A | 7/1994 | |
| JP | 7-046855 A | 2/1995 | |
| JP | 2005-253229 A | 9/2005 | |
| JP | 2008172949 A | 7/2008 | |
| JP | 2009-017671 A | 1/2009 | |
| JP | 2010-063239 A | 3/2010 | |
| JP | 2010103733 A | 5/2010 | |
| WO | 2010/103733 A1 | 9/2010 | |
| WO | 2010119929 A1 | 10/2010 | |

OTHER PUBLICATIONS

Communication dated Sep. 4, 2014, issued by the National Institute of Industrial Property of France in corresponding French Application No. 1157666.

* cited by examiner

FIG. 5

| | CURRENT DETECTION PERIOD | LOSS | VOLTAGE SATURATION DISTORTION | DIFFERENCE BETWEEN MAX AND MIN OF THREE-PHASE VOLTAGE COMMANDS | VOLTAGE SATURATION | ADVANTAGE |
|---|---|---|---|---|---|---|
| FIRST SUPERIMPOSED VOLTAGE COMMAND $Vx1^*$ | MEDIUM | SMALL | LARGE | 0 ~ 0.9Vdc | NO | LOSS BY CURRENT DETECTION RESISTOR SMALL |
| SECOND SUPERIMPOSED VOLTAGE COMMAND $Vx2^*$ | LARGE | LARGE | LARGE | 0.9Vdc ~ 1.0Vdc | | CURRENT DETECTION PERIOD SECURED |
| THIRD SUPERIMPOSED VOLTAGE COMMAND $Vx3^*$ | LARGE | LARGE | SMALL | 1.0Vdc ~ | YES | VOLTAGE SATURATION SUPPRESSED |

POWER INVERTER AND ELECTRIC POWER STEERING CONTROLLER

BACKGROUND OF THE INVENTION

1. Field of the Invention

The present invention relates to a power inverter for converting DC power into AC power and an electric power steering controller using the same.

2. Description of the Related Art

The power inverter for converting DC into AC applies AC voltages to an AC rotary machine, thereby enabling the machine to produce torque. The torque from the AC rotary machine is proportional to a vector product of rotor magnetic flux and an armature current through the AC rotary machine; therefore from the perspective of controlling the torque from the AC rotary machine, it is important to know the armature current, that is, to detect the current flowing through the rotary machine. One of methods of detecting the current flowing through the AC rotary machine is the one using an isolated-type detector provided with a Hall effect element although it is quite expensive.

With this in mind, in a conventional power inverter described in Patent Document 1, a current detection resister is connected between one of switching elements of an arm constituting a PWM inverter and a DC power source, and a voltage across the terminals of the current detection resister is sample-held synchronized with a specific timing during the ON period of the switching element, whereby a phase current through a corresponding phase is detected. In a conventional power inverter as described above, an inexpensive current detection resister is used instead of the Hall effect element; therefore, the AC rotary machine can be controlled without using such an expensive isolated-type detector for the current detection.

However, in the foregoing conventional power inverter, the voltage across the terminals of the current detection resister needs to be sample-held synchronized with the specific timing during the ON period of the switching element; therefore, when a voltage of high amplitude accompanied with saturation, which is called over-modulation, is applied to the AC rotary machine, the ON period of the switching element becomes insufficient, which has caused a problem in that required current detection accuracy cannot be achieved even if the voltage across the current detection resister terminals is sample-held.

As a method of resolving this problem with the insufficient ON period of the switching element that inhibits the required current detection accuracy, there is known a power inverter that takes control in such a way that two currents are detected so as to discover another current by calculation. In another conventional power inverter described in Patent Document 2, for example, at least currents through any two phases out of the total three phases are detected, and a third one is discovered at least by the calculation based on the principle that the sum of all of the phase currents should be always zero so that currents flowing through one of the sides of the inverter inside a frequency converter can be measured accurately.

Moreover, in another conventional power inverter described in Patent Document 3, for example, command voltages are offset toward a potential side of the pair of potentials of the DC power source, which does not correspond to current detection resisters used for detecting a current through each phase of a multi-phase rotary machine, so that periods in which switching elements connected to the respective current detection resisters used for current detection are turned into the ON state are expanded in all of the phases. Thereby, the current detection periods can be avoided from becoming too short, and as a result, the current can be detected more accurately.

On the other hand, differing from the isolate-type detector using the Hall effect element, when currents flow through the current detection resisters in the conventional power inverters described in Patent Document 2 and Patent Document 3, ohmic loss arises, causing a problem in that power loss increases. In Patent Document 4, for example, another conventional power inverter is described that aims at resolving the problem with increasing power loss attributed to those current detection resisters.

In the conventional power inverter described in Patent Document 4, the sum of switching loss by each switching element and ohmic loss by each current detection resister when three-phase voltage command wave signals are shifted equally toward the positive side so that the maximum signal of the three-phase voltage command wave signals becomes equal to the height of a peak of a carrier wave is compared with that of switching loss by each switching element and ohmic loss by each current detection resister when the three-phase voltage command wave signals are shifted toward the negative side so that the minimum signal of the three-phase voltage command wave signals becomes equal to the depth of a trough of the carrier wave, whichever smaller is selected out of the two, and then the three-phase voltage command wave signals are equally shifted. By selecting the smaller of the two, the problem with power loss by the power inverter has been resolved, resulting in realizing smaller loss.

Moreover, another conventional power inverter is described in Patent Document 5, for example, that can reduce, by reducing switching frequency, switching loss that increases depending on a current increase. In the conventional power inverter described in Patent Document 5, a PWM signal is generated for each phase so that switching operation of each phase of the inverter is alternately stopped for a predetermined period of time, that is, two-phase PWM control is taken, whereby the switching operation of the inverter is controlled. At this moment, a phase voltage and a line current are detected at least any one of the phases, and the phase difference (power factor angle) between the voltage and the current is obtained. The obtained power factor angle is used for taking control of generative operation of the PWM signal for each phase. This control is taken in such a way that the switching stop period for each phase of the inverter follows the proximity of a peak of the line current flowing through the inverter load. Therefore, in this conventional power inverter, since the switching stop period follows the proximity of the peak of the line current, the switching loss that increases depending on the current increase can be suppressed.

Patent Document 1:
Japanese Laid-open Patent Publication No. S63-80774
Patent Document 2:
Japanese Laid-open Patent Publication No. H6-205589
Patent Document 3:
Japanese Patent Publication No. 2010-63239
Patent Document 4:
Japanese Patent Publication No. 2009-17671
Patent Document 5:
Japanese Laid-open Patent Publication No. H7-046855

In the conventional power inverter described in Patent Document 1, when a voltage of high amplitude is applied to the AC rotary machine, the ON period of the switching element becomes insufficient, which has caused problems in that required current detection accuracy cannot be achieved even if the voltage across the terminals of the current detection resister is sample-held, and in addition, power loss arises attributed to the ohmic loss by the current detection resister.

Moreover, the conventional power inverter described in Patent Document 2 is set to achieve the required accuracy by discovering a third phase current by the calculation; however there has been a problem with power loss attributed to the ohmic loss by the current detection resisters.

Moreover, in the conventional power inverter described in Patent Document 3, since the periods of the switching elements, connected to the current detection resisters, being turned into the ON state are expanded in all of the phases, there has been a problem in that power loss attributed to the ohmic loss by the current detection resisters increases although the required accuracy of current detection can be achieved. Furthermore, when voltages having amplitude accompanied with saturation called over-modulation are applied to the AC rotary machine, there has been another problem in that the saturation characteristics differs from each other in the positive and negative sides due to the off-setting of the command voltages, thereby causing distorted voltages.

Moreover, in the conventional power inverters described in Patent Document 1 to Patent Document 3, there has been a problem in that the power loss attributed to the ohmic loss by the current detection resisters becomes a factor of deteriorating power conversion efficiency and causes heat generation in the inverters.

Moreover, in the conventional power inverter described in Patent Document 4, the sum of the switching loss by each switching element and the ohmic loss by each current detection resister when the three-phase voltage command wave signals are equally shifted toward the positive side is compared with that of the switching loss by each switching element and the ohmic loss by each current detection resister when three-phase voltage command wave signals are equally shifted toward the negative side, and whichever smaller is selected out of the two, whereby the problem with the power loss attributed to the ohmic loss by the current detection resisters has been resolved; however, there has been a problem in that in selecting the voltage command wave signals, the voltage command wave signals become discontinuous with respect to time, thereby causing current distortion. Moreover, there has been another problem in that when the resolution of output voltages is limited due to digital processing and the like, if the three-phase voltage command wave signals are equally shifted toward the positive side in a range where the voltage command amplitude at each phase is low, the amplitude is further lowered, so that the accuracy of outputting the voltages would be reduced.

Moreover, in the conventional power inverter described in Patent Document 5, the three-phase voltage command wave signals are set to be equally shifted so that the switching operation in each phase of the inverter is stopped alternately for the predetermined period; however the quantity of this shifting changes rectangularly and has discontinuities with respect to time, and as a result, the voltage waveforms become discontinuous with respect to time. Discontinuities arising with respect to time would cause current ripples, thereby causing a problem with increasing noise and vibration.

Moreover, when the AC rotary machine is driven using the conventional power inverters described above, if the saturation characteristics are different from each other in the positive and negative sides and/or the voltage command wave signals become discontinuous, current distortion arises, thereby causing another problem in that torque ripples and abnormal noise arise.

For example, when the AC rotary machine is supplied with voltages using the foregoing conventional power inverters in an electric power steering controller, if the saturation characteristics are different from each other in the positive and negative sides and/or the voltage command wave signals become discontinuous, torque ripples arise, which is in turn transmitted to driver hands holding the steering wheel, causing an unpleasant feeling. Moreover, there has been another problem in that when the electric power steering controller is located in the vehicle interior, if the saturation characteristics are different from each other in the positive and negative sides and/or the voltage command wave signals become discontinuous, abnormal noise arises in the vehicle interior, thereby also causing an unpleasant feeling to the driver.

SUMMARY OF THE INVENTION

The present invention has been made to resolve the problems described above, which aims at providing a power inverter that can supply an AC rotary machine with voltages having high amplitude but little distortion while suppressing power loss attributed to the current detection resisters.

A power inverter of the present invention that outputs based on three-phase voltage commands three-phase voltages comprises: a superimposed voltage command computing means for computing and outputting a superimposed voltage command; a voltage command modification means for adding the superimposed voltage command to each of the three-phase voltage commands and outputting modified three-phase voltage commands; and an voltage outputting means for outputting the three-phase voltages based on the modified three-phase voltage commands; wherein the superimposed voltage command computing means outputs the superimposed voltage command depending on the difference between maximum value and a minimum value of the three-phase voltage commands.

According to the present invention, pronounced effects that have never been realized before can be brought about, in which a high voltage can be output with low loss by using the superimposed voltage command depending on the difference between the maximum value and the minimum value of the three-phase voltage commands.

The foregoing and other object, features, aspects and advantages of the present invention will become more apparent from the following detailed description of the present invention when taken in conjunction with the accompanying drawings.

BRIEF DESCRIPTION OF THE DRAWINGS

FIG. 5 is a table for comparing a first superimposed voltage command Vx1*, a second superimposed voltage command Vx2* and a third superimposed voltage command Vx3* with one another;

DETAILED DESCRIPTION OF THE PREFERRED EMBODIMENTS

Embodiment 1

Figure 1:
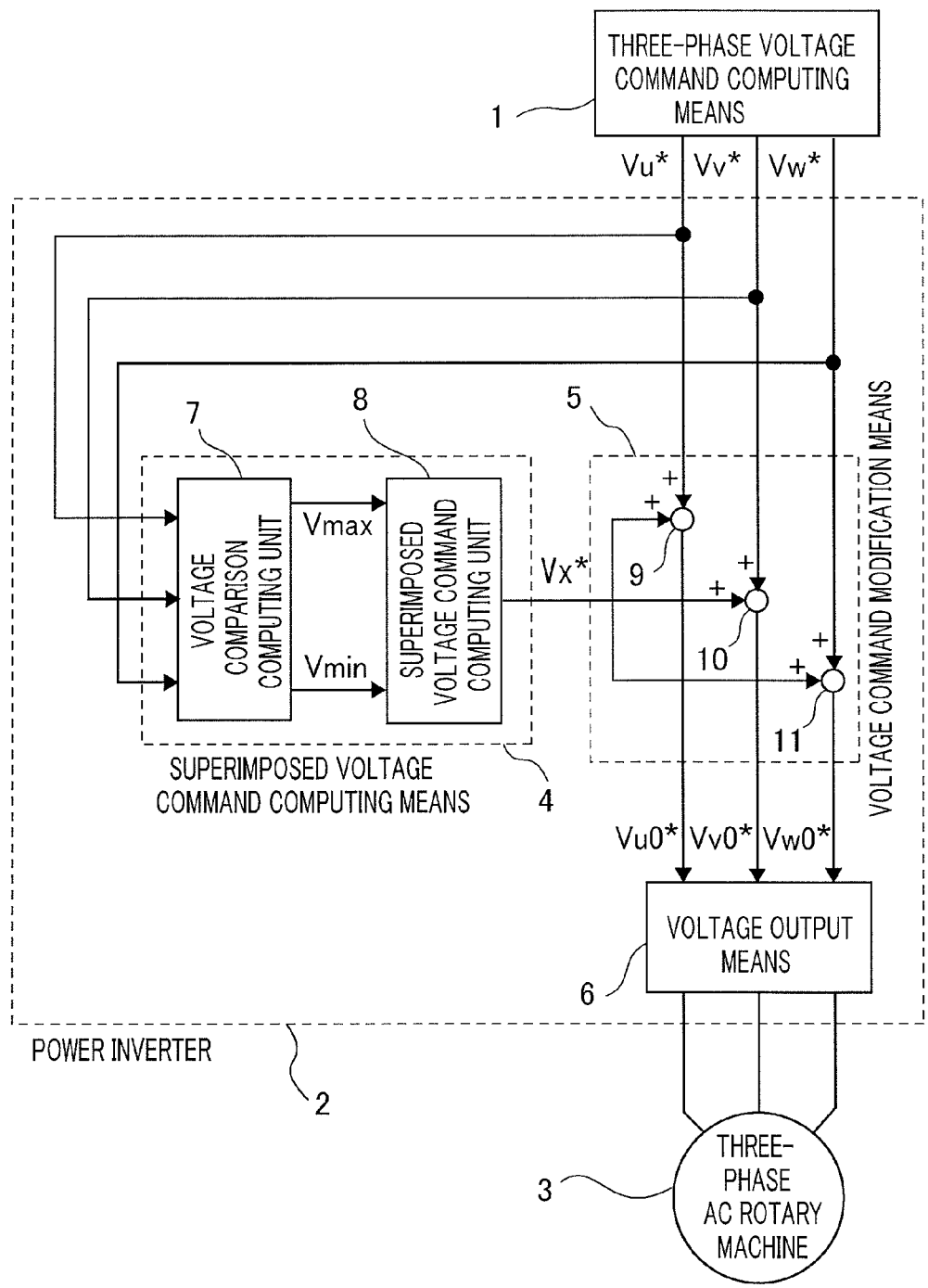
FIG. 1 is a diagram showing the entire configuration of a power inverter according to Embodiment 1 of the present invention.

FIG. 1 is a diagram showing the entire configuration of a power inverter according to Embodiment 1 of the present invention.

In the figure, a three-phase voltage command computing means 1 outputs to a power inverter 2 a U-phase voltage command Vu*, a V-phase voltage command Vv* and a W-phase voltage command Vw*. The power inverter 2 outputs based on the three-phase voltage commands Vu*, Vv*, Vw* three-phase voltages Vu, Vv, Vw, which are applied to a three-phase AC rotary machine 3.

The power inverter 2 includes a superimposed voltage command computing means 4 for computing based on the three-phase voltage commands Vu*, Vv*, Vw* and outputting the result as a superimposed voltage command Vx*; a voltage command modification means 5 for adding the superimposed voltage command Vx* to each of the three-phase voltage commands Vu*, Vv*, Vw* and outputting modified three-phase voltage commands Vu0*, Vv0*, Vw0*; and a voltage output means 6 for applying to the three-phase AC rotary machine 3 the three-phase voltages Vu, Vv, Vw based on the modified three-phase voltage commands Vu0*, Vv0*, Vw0*.

The superimposed voltage command computing means 4 includes a voltage comparison computing unit 7 and a superimposed voltage command computing unit 8, and outputs the superimposed voltage command Vx* depending on the difference between a maximum value and a minimum value of the three-phase voltage commands Vu*, Vv*, Vw*.

The voltage comparison computing unit 7 obtains the minimum value of the three-phase voltage commands Vu*, Vv*, Vw* using Equation (2) and outputs the result as the minimum voltage Vmin, as well as obtains the maximum value of the three-phase voltage commands Vu*, Vv*, Vw* using Equation (1), which is output as the maximum voltage Vmax.

$$V\text{max}=\max(Vu^*,Vv^*,Vw^*) \quad (1)$$

$$V\text{min}=\min(Vu^*,Vv^*,Vw^*) \quad (2)$$

The superimposed voltage command computing unit 8 outputs the superimposed voltage command Vx* depending on the difference between the maximum voltage Vmax and the minimum voltage Vmin.

The voltage command modification means 5 includes an adder 9 for adding the superimposed voltage command Vx* to the U-phase voltage command Vu* and outputting a modified U-phase voltage command Vu0*; an adder 10 for adding the superimposed voltage command Vx* to the V-phase voltage command Vv* and outputting a modified V-phase voltage command Vv0*; and an adder 11 for adding the superimposed voltage command Vx* to the W-phase voltage command Vw* and outputting a modified W-phase voltage command Vw0*.

Now, the operation of the voltage command modification means 5 will be explained. From the operation described above, the following Equations (3)-(5) are true among the modified three-phase voltage commands Vu0*, Vv0*, Vw0*; the three-phase voltage commands Vu*, Vv*, Vw*; and the superimposed voltage command Vx*.

$$Vu0^*=Vu^*+Vx^* \quad (3)$$

$$Vv0^*=Vv^*+Vx^* \quad (4)$$

$$Vw0^*=Vw^*+Vx^* \quad (5)$$

Each phase of the three-phase AC rotary machine 3 is isolated from the ground potential, and currents flow through the three-phase AC rotary machine 3 depending on phase-to-phase potential differences, that is, line-to-line voltages. Here, each phase-to-phase potential difference of the modified three-phase voltage commands can be obtained using Equations (3)-(5) as follows:

$$Vu0^*-Vv0^*=(Vu^*+Vx^*)-(Vv^*+Vx^*)=Vu^*-Vv^* \quad (6)$$

$$Vv0^*-Vw0^*=(Vv^*+Vx^*)-(Vw^*+Vx^*)=Vv^*-Vw^* \quad (7)$$

$$Vw0^*-Vu0^*=(Vw^*+Vx^*)-(Vu^*+Vx^*)=Vw^*-Vu^* \quad (8)$$

As seen from Equations (6)-(8), the phase-to-phase potential differences among the modified three-phase voltage commands Vu0*, Vv0*, Vw0* are the same as those among the three-phase voltage commands Vu*, Vv*, Vw*, respectively, regardless of the value of the superimposed voltage command Vx*. In other words, even when the voltage output means 6 applies voltages to the three-phase AC rotary machine 3 based on the modified three-phase voltage commands Vu0*, Vv0*, Vw0*, the line-to-line voltages of the three-phase AC rotary machine 3 are the same as those when the voltage output means 6 applies based on the three-phase voltage commands Vu*, Vv*, Vw*.

As will be described later, however, when voltage saturation occurs in the voltage output means 6, the line-to-line voltages applied to the three-phase AC rotary machine based on the modified three-phase voltage commands are not always the same as those applied based on the three-phase voltage commands Vu*, Vv*, Vw*.

Figure 2:
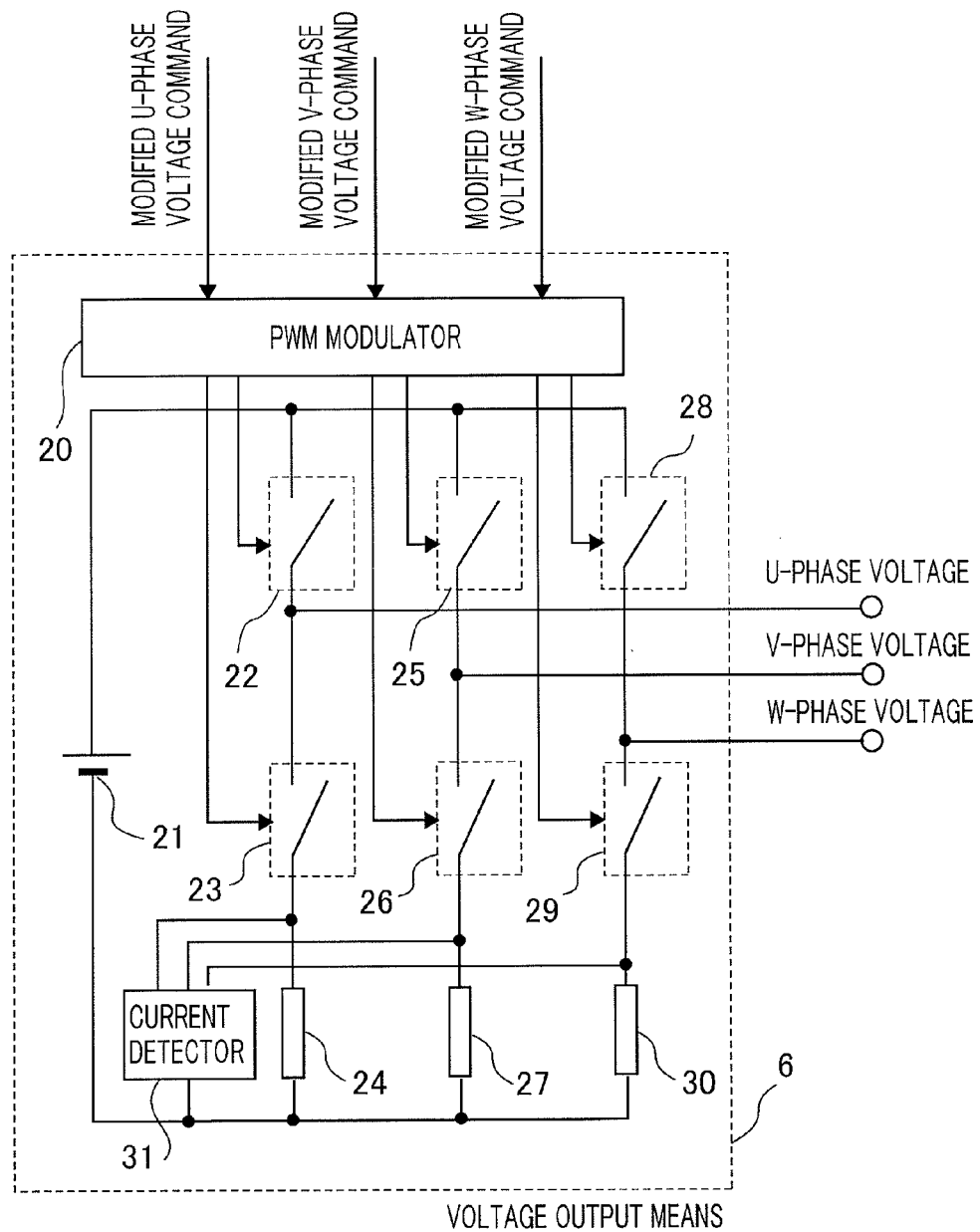
FIG. 2 is a diagram showing the internal configuration of a voltage output means 6 according to Embodiment 1 of the invention.

FIG. 2 is a diagram showing the internal configuration of the voltage output means 6. In the figure, a PWM modulator 20 converts the modified U-phase voltage command Vu0* into an ON/OFF signal through PWM modulation, turns on and off a semiconductor switch 22 and also turns on and off a semiconductor switch 23 in the opposite phase to the semiconductor switch 22. The U-phase voltage is output in accordance with the modified U-phase voltage command Vu0* with the semiconductor switch 22 and the semiconductor switch 23 turned on and off. In other words, a DC voltage Vdc from a DC power source 21 is converted into the U-phase voltage, that is, an AC voltage, by the ON/OFF operations of the semiconductor switch 22 and the semiconductor switch 23. Moreover, a current detection resister 24 for detecting a U-phase current is connected between the semiconductor switch 23 and the negative side of the DC power source 21.

Similarly, the PWM modulator 20 converts the modified V-phase voltage command Vv0* into an ON/OFF signal through the PWM modulation, turns on and off a semiconductor switch 25 and also turns on and off a semiconductor switch 26 in the opposite phase to the semiconductor switch 25. The V-phase voltage is output in accordance with the modified V-phase voltage command Vv0* with the semiconductor switch 25 and semiconductor switch 26 turned on and off. Moreover, a current detection resister 27 for detecting a V-phase current is connected between the semiconductor switch 26 and the negative side of the DC power source 21.

Similarly, the PWM modulator 20 converts the modified W-phase voltage command Vw0* into an NO/OFF signal through the PWM modulation, turns on and off a semiconductor switch 28 and also turns on and off a semiconductor switch 29 in the opposite phase to the semiconductor switch 28. The W-phase voltage is output in accordance with the modified W-phase voltage command Vw0* with the semiconductor switch 28 and semiconductor switch 29 turned on and off. Moreover, a current detection resister 30 for detecting a W-phase current is connected between the semiconductor switch 29 and the negative side of the DC power source 21.

A current detector 31 detects as a U-phase current iu a voltage across the terminals of the current detection resister 24 and also detects as a V-phase current iv a voltage across the terminals of the current detection resister 27. Similarly, the detector detects as a W-phase current iw a voltage across the terminals of the current detection resister 30.

Figure 3:
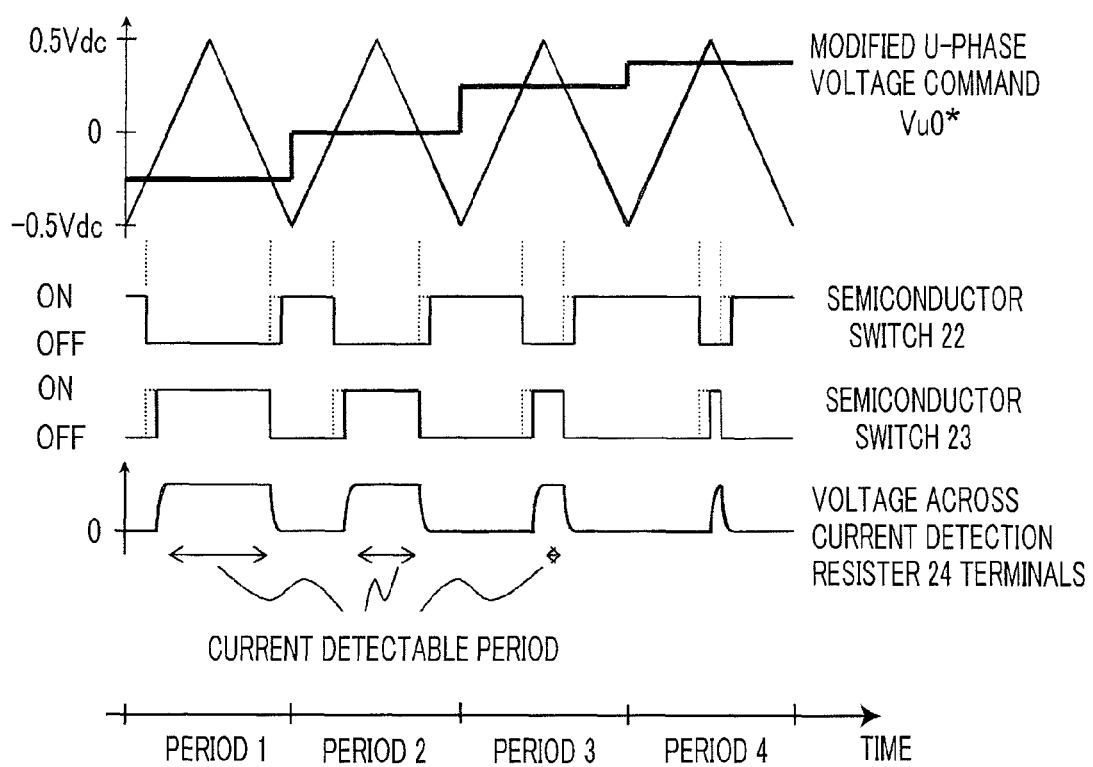
FIG. 3 is a diagram for explaining the operation of the voltage output means 6 according to Embodiment 1 of the invention.

FIG. 3 is a diagram for explaining the operation of the voltage output means 6. The figure plots time as the abscissa; the modified U-phase voltage command Vu0* is dealt with in a case of monotonically increasing between a period 1 and a period 4. The triangular-wave signal shown in the top part of FIG. 3 is a carrier wave that is an internal signal of the PWM modulator 20. The PWM modulator 20 turns off the semiconductor switch 22 and at the same time turns on the semiconductor switch 23 when the carrier wave becomes higher than the modified U-phase voltage command Vu0*, whereas when it becomes lower than the modified U-phase voltage command Vu0*, the modulator turns on the semiconductor switch 22 and at the same time turns off the semiconductor switch 23.

If the semiconductor switch 22 and the semiconductor switch 23 are turned on at the same time, the DC power source 21 is short-circuited; therefore when the semiconductor switch 22 and the semiconductor switch 23 are turned on, the rising timing of each of the semiconductor switches is delayed by a predetermined time. This delayed time is widely known as a short-circuit protection time or a dead time.

The voltage across the terminals of the current detection resister 24 is proportional to the amplitude of the current flowing through the resister 24. As seen from the fourth part from the top of FIG. 3, the current flowing through the resister 24 arises during the ON period of the semiconductor switch 23. Just before and after the semiconductor switch 23 being switched over between the ON and OFF states, the current also comes into a transient state due to the ON/OFF switching. The current detector 31 sample-holds the voltage across the current detection resister 24 terminals at the proximity of a peak timing of the carrier wave so as to avoid the transient state, and detects the U-phase current value. The ON period of the semiconductor switch 23 is long during the period 1 in which the modified U-phase voltage command Vu0* takes a small value; therefore the period of the U-phase current flowing through the current detection resister 24 also becomes long, so that the current detector 31 can detect the U-phase current value while easily avoiding the transient state. However, the longer the period of the U-phase current flowing through the current detection resister 24, the longer the period of ohmic loss arising in the current detection resister. As the modified U-phase voltage command Vu0* becomes higher with time progressing from the period 2 to period 3 and so on, the ON period of the semiconductor switch 23 becomes shorter; which in turn makes the period of the U-phase current flowing through the current detection resister 24 shorter. As a result, the ohmic loss arising in the current detection resister 24 also becomes smaller.

Meanwhile, when the modified U-phase voltage command Vu0* takes a large value as shown in the period 4, the ON period of the semiconductor switch 23 becomes extremely short; therefore, the current flowing through the current detection resister 24 is put into a state of only transients from ON to OFF and vice versa, which makes it impossible for the current detector 31 to detect the U-phase current from the voltage across the current detection resister 24 terminals. In this Embodiment, when the modified U-phase voltage command Vu0* becomes higher than 0.4×Vdc, the current detector 31 is assumed to be unable to detect the U-phase current from the voltage across the current detection resister 24 terminals. Therefore, setting of the modified U-phase voltage command Vu0* to as large a value as possible but smaller than 0.4×Vdc can reduce the ohmic loss arising in the current detection resister while securing a period enabling detection of the U-phase current. Here, the value 0.4×Vdc depends on a ratio of a time necessary for turning on and off each of the semiconductor switches 22 and 23 to the carrier wave period; the value varies depending on power inverters. Therefore, although this value is set to 0.4×Vdc in this Embodiment, it may be replaced with other different values for each power inverter.

Moreover, when the modified U-phase voltage command Vu0* is higher than 0.5×Vdc, the semiconductor switch 22 continues to be on, whereas the semiconductor switch 23 continues to be off. Therefore, when the modified U-phase voltage command Vu0* is higher than 0.5×Vdc, whatever value the voltage command Vu0* takes, the semiconductor switches and 23 operate the same as when the modified U-phase voltage command Vu0* is 0.5×Vdc, and as a result, the output U-phase voltage Vu becomes 0.5×Vdc. This state is referred to as voltage saturation or over-modulation. At this moment, since the U-phase current does not flow through the current detection resister 24, the current detector 31 can no longer detect the U-phase current from the voltage across the current detection resister 24 terminals.

Similarly, when the modified U-phase voltage command Vu0* is lower than −0.5×Vdc, the semiconductor switch 22 continues to be off, whereas the semiconductor switch 23 continues to be on. Therefore, when the modified U-phase voltage command Vu0* is lower than −0.5×Vdc, whatever value the voltage command Vu0* takes, the semiconductor switches and 23 operate the same as when the modified U-phase voltage command Vu0* is −0.5×Vdc, and as a result, the output U-phase voltage Vu becomes −0.5×Vdc. This state is also referred to as voltage saturation or over-modulation. At this moment, since the U-phase current flows through the current detection resister 24, the current detector 31 can detect the U-phase current from the voltage across the current detection resister 24 terminals. As described above, if the modified U-phase voltage command Vu0* goes beyond a range from −0.5×Vdc to 0.5×Vdc, the voltage saturation occurs in the voltage output means 6. When the modified U-phase voltage command Vu0* is higher than 0.5×Vdc, the U-phase current cannot be detected; meanwhile when the modified U-phase voltage command Vu0* is lower than −0.5×Vdc, the U-phase current can be detected. So far explanations have been focused only on the U-phase in FIG. 3; however, it goes without saying that the same explanation can be made on the V- and W-phases.

As described above, the voltage output means 6 takes ON/OFF control of pairs of semiconductor switches connected in series so that the three-phase voltages Vu, Vv, Vw coincide with the modified U-phase voltage commands Vu0*, Vv0*, Vw0*, respectively. The maximum amplitude of each of the three-phase voltages Vu, Vv, Vw is proportional to the DC power source voltage; if the modified voltage commands exceed the maximum amplitude at any phase, the voltage at the phase is saturated at the maximum amplitude.

Figure 4:
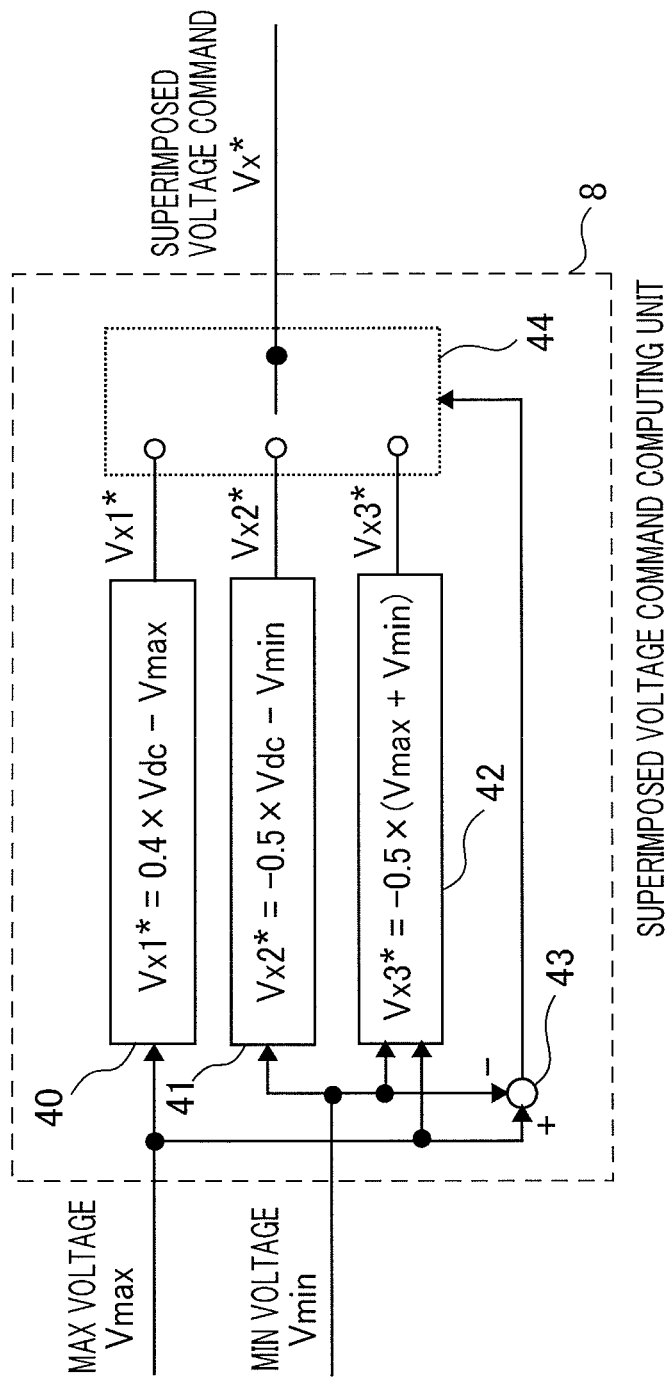
FIG. 4 is a diagram showing the internal configuration of a superimposed voltage command computing unit 8 according to Embodiment 1 of the invention.

FIG. 4 is a diagram showing the internal configuration of the superimposed voltage command computing unit 8. A first superimposed voltage command computing unit 40 computes a first superimposed voltage command Vx1* based on the maximum voltage Vmax. A second superimposed voltage command computing unit 41 computes a second superimposed voltage command Vx2* based on the minimum voltage Vmin. A third superimposed voltage command computing unit 42 computes a third superimposed voltage command Vx3* based on the maximum voltage Vmax and the minimum voltage Vmin. A subtractor 43 computes the difference between the maximum voltage Vmax and the minimum voltage Vmin and output the difference to a selector 44. The selector 44 selects any one out of the first superimposed voltage command Vx1*, the second superimposed voltage command Vx2* and the third superimposed voltage command Vx3*, depending on the difference between the maximum voltage Vmax and the minimum voltage Vmin, and output the selected result as the superimposed voltage command Vx*. The selector 44 selects the superimposed voltage command depending on the difference between the maximum value Vmax and the minimum value Vmin; the selection process follows FIG. 5 to be described later.

Now, the first superimposed voltage command Vx1*, the second superimposed voltage command Vx2* and the third superimposed voltage command Vx3* each will be explained.

The first superimposed voltage command Vx1* is obtained by computing using Equation (9).

$$Vx1^* = 0.4 \times Vdc - V\text{max} \tag{9}$$

The value of the DC voltage Vdc used in Equation (9) may be fixed at a voltage equivalent to the DC power source voltage or, by detecting a voltage of the DC power source 21, the detected value may be given to Vdc. When the first superimposed voltage command Vx1* is added to each of the three-phase voltage commands Vu*, Vv*, Vw* so as to obtain the modified three-phase voltage commands Vu0*, Vv0*, Vw0*, respectively, the maximum value of the modified three-phase voltage commands Vu0*, Vv0*, Vw0* becomes 0.4×Vdc {=Vmax+(0.4×Vdc−Vmax)}. Although the first term Vdc of the right-hand side of Equation (9) is multiplied by a coefficient of 0.4 in this Embodiment; however this coefficient may not be 0.4. If this coefficient nears 0.5, the maximum value of the modified three-phase voltage commands Vu0*, Vv0*, Vw0* nears 0.5×Vdc; therefore a current flowing through the phase corresponding to the maximum value becomes unable to be detected. Therefore, if the coefficient is selected within a range enabling the phase current detection as described n FIG. 3, currents through all of the three phases can be detected. In this Embodiment, since the value 0.4 is given to the coefficient of the first term of the right-hand side of Equation (9), the maximum value of the modified three-phase voltage commands Vu0*, Vv0*, Vw0* can be made 0.4×Vdc, and as a result, periods necessary for detecting the phase currents can be secured for all of the three phases. Moreover, if the minimum value of the modified three-phase voltage commands Vu0*, Vv0*, Vw0* is larger than −0.5×Vdc, the voltage output means 6 is not voltage-saturated and can output the voltages. In other words, if the difference between the maximum and minimum values of the three-phase voltage commands Vu*, Vv*, Vw* is within a range of 0.9×Vdc, the voltage output means 6 is not voltage-saturated and can output the voltages. As described above, when the first superimposed voltage command Vx1* is given to the superimposed voltage command Vx*, the voltage commands can be made larger in all of the three phases within the range enabling the phase current detection; therefore, the ohmic loss arising in the current detection resisters can be suppressed while securing the current detection periods for the respective phases.

As described above, when the first superimposed voltage command Vx1* is given to the superimposed voltage command Vx*, the superimposed voltage command computing means 4 outputs the superimposed voltage command Vx* in such a way that the maximum value of the modified three-phase voltage commands Vu0*, Vv0*, Vw0* becomes a first constant (0.4×Vdc); therefore, an effect can be brought about in which the modified three-phase voltage commands Vu0*, Vv0*, Vw0* that can shorten periods of currents flowing through the current detection resisters can be obtained while securing the periods necessary for the current detection in the three phases.

The second superimposed voltage command Vx2* is obtained by computing using Equation (10).

$$Vx2^* = -0.5 \times Vdc - V\text{min} \tag{10}$$

Similarly to the foregoing Equation (9), the DC voltage Vdc may be fixed at a predetermined voltage, or by detecting a voltage of the DC power source 21, the detected value may be given to Vdc. When the second superimposed voltage command Vx2* is added to the three-phase voltage commands Vu*, Vv*, Vw* so as to obtain the modified three-phase voltage commands Vu0*, Vv0*, Vw0*, respectively, the minimum value of the modified three-phase voltage commands Vu0*, Vv0*, Vw0* becomes −0.5×Vdc {=Vmin+(−0.5×Vdc−Vmin)}. In this Embodiment, when the first term Vdc of the right-hand side of Equation (10) is multiplied by a coefficient of 0.5, the minimum value of the modified three-phase voltage commands Vu0*, Vv0*, Vw0* can be made −0.5×Vdc. At this moment, if the maximum value of the modified three-phase voltage commands Vu0*, Vv0*, Vw0* is smaller than 0.5×Vdc, the voltage output means 6 can output the voltages without being voltage-saturated. In other words, if the difference between the maximum and minimum values of the three-phase voltage commands Vu*, Vv*, Vw* is within 1.0×Vdc, the voltage output means 6 is not voltage-saturated and can output the voltages.

As described above, when the second superimposed voltage command Vx2* is given to the superimposed voltage command Vx*, the superimposed voltage command computing means 4 outputs the superimposed voltage command Vx* in such a way that the minimum value of the modified three-phase voltage commands Vu0*, Vv0*, Vw0* becomes a second constant (−0.5×Vdc); therefore an effect can be brought about in which the periods for current detection can be expanded within a range enabling voltage saturation to be avoided. In addition, when the second superimposed voltage command Vx2* is given to the superimposed voltage command Vx*, the superimposed voltage command continuously varies with respect to time, which brings about another effect of suppressing the occurrence of current ripples.

The third superimposed voltage command Vx3* is obtained by computing using Equation (11).

$$Vx3^* = -0.5 \times (V\text{max} + V\text{min}) \quad (11)$$

When the third superimposed voltage command Vx3* is added to the three-phase voltage commands Vu*, Vv*, Vw* so as to obtain the modified three-phase voltage commands Vu0*, Vv0*, Vw0*, respectively, the minimum value of the modified three-phase voltage commands Vu0*, Vv0*, Vw0* becomes −0.5×(Vmax−Vmin) {=Vmin+[−0.5×(Vmax+Vmin)]} and the maximum value of the modified three-phase voltage commands Vu0*, Vv0*, Vw0* becomes 0.5×(Vmax−Vmin) {=Vmax+[−0.5×(Vmax+Vmin)]}. Therefore, if the difference between the maximum and minimum values of the three-phase voltage commands Vu*, Vv*, Vw* is smaller than Vdc, the voltage output means 6 is not voltage-saturated and can output the voltages.

Moreover, when the difference between the maximum and minimum values of the three-phase voltage commands Vu*, Vv*, Vw* is larger than Vdc, the voltage output means 6 is voltage-saturated; however the saturation characteristics are the same in the positive and negative sides. In a conventional power inverter, there has been a problem in that when voltages of amplitude accompanied with saturation are applied to the AC rotary machine, the saturation characteristics differ from each other in the positive and the negative sides due to the offsetting of the command voltages, thereby causing distorted voltages.

As described above, when the third superimposed voltage command Vx3* is given to the superimposed voltage command Vx*, the value of the superimposed voltage command is made to be the average of the maximum and minimum values of the three-phase voltage commands; therefore the saturation characteristics can be made the same in the positive and negative sides, so that an effect can be brought about in which voltages whose distortion is minimized can be output in such cases as over-modulation or voltage saturation occurring.

FIG. 5 is a table for comparing the first superimposed voltage command Vx1*, the second superimposed voltage command Vx2* and the third superimposed voltage command Vx3* with one another.

When the first superimposed voltage command Vx1* is used for computing the modified three-phase voltage commands, the periods for detecting the three-phase currents can be secured, as well as the ohmic loss arising in the current detection resisters can be suppressed. However, since the voltage utilization rate in using the first superimposed voltage command Vx1* is lower than those in using the second superimposed voltage command Vx2* and the third superimposed voltage command Vx3*, if the difference between the maximum value Vmax and the minimum value Vmin of the three-phase voltage commands exceeds 0.9×Vdc, voltage saturation occurs. Therefore, the first superimposed voltage command is used when the difference (Vmax−Vmin) is smaller than 0.9×Vdc.

When the second superimposed voltage command Vx2* is used for computing the modified three-phase voltage commands, as far as the difference (Vmax−Vmin) is smaller than 1.0×Vdc, the voltage saturation does not occur even if (Vmax−Vmin) is larger than 0.9×Vdc. Moreover, the second superimposed voltage command Vx2* serves to secure the current detection periods as much as possible; therefore, even if (Vmax−Vmin) is larger than 0.9×Vdc, currents through any two phases out of the three phases can be securely detected. Moreover, since the voltage saturation occurs when the difference between the maximum value Vmax and the minimum value Vmin of the three-phase voltage commands exceeds 1.0×Vdc, the second superimposed voltage command is used when (Vmax−Vmin) is in a rage between 0.9×Vdc and 1.0×Vdc.

When the third superimposed voltage command Vx3* is used for computing the modified three-phase voltage commands, the saturation characteristics can be made the same in the positive and negative sides; therefore, the voltage output means can output voltages whose distortion when the difference between the maximum value Vmax and the minimum value Vmin exceeds 1.0×Vdc is suppressed to its minimum limit. In addition, even when the third superimposed voltage command Vx3* is used, if the difference between the maximum value Vmax and the minimum value Vmin does not exceed a predetermined value, currents through two phases can be securely detected out of the three phases. In this Embodiment, if the difference between the maximum value Vmax and the minimum value Vmin does not exceed 1.04×Vdc, currents through two phases can be securely detected out of the three phases.

Therefore, by computing the superimposed voltage command Vx* depending on the difference between the maximum value Vmax and the minimum value Vmin of FIG. 5, the detection periods for the three-phase currents are secured when the difference (Vmax−Vmin) is smaller than 0.9×Vdc; meanwhile when it is larger than 0.9×Vdc, the detection periods for two phases out of the three phases can be secured.

It is widely known that the three-phase rotary machine 3 can be driven well as far as currents through any two phases can be detected out of the three phases.

As described above, since the superimposed voltage command computing means 4 selectively switches over the equations for computing the superimposed voltage command depending on the difference between the maximum value Vmax and the minimum value Vmin of the three-phase voltage commands Vu*, Vv*, Vw* so as to output the superimposed voltage command Vx*, the equations can be switched over to the one suited to coping with a particular problem such as easiness of current detection, ohmic loss by the current detection resisters or voltage distortion when over-modulation occurs, so that an effect can be brought about in which a high voltage can be output with low loss.

Figure 6:
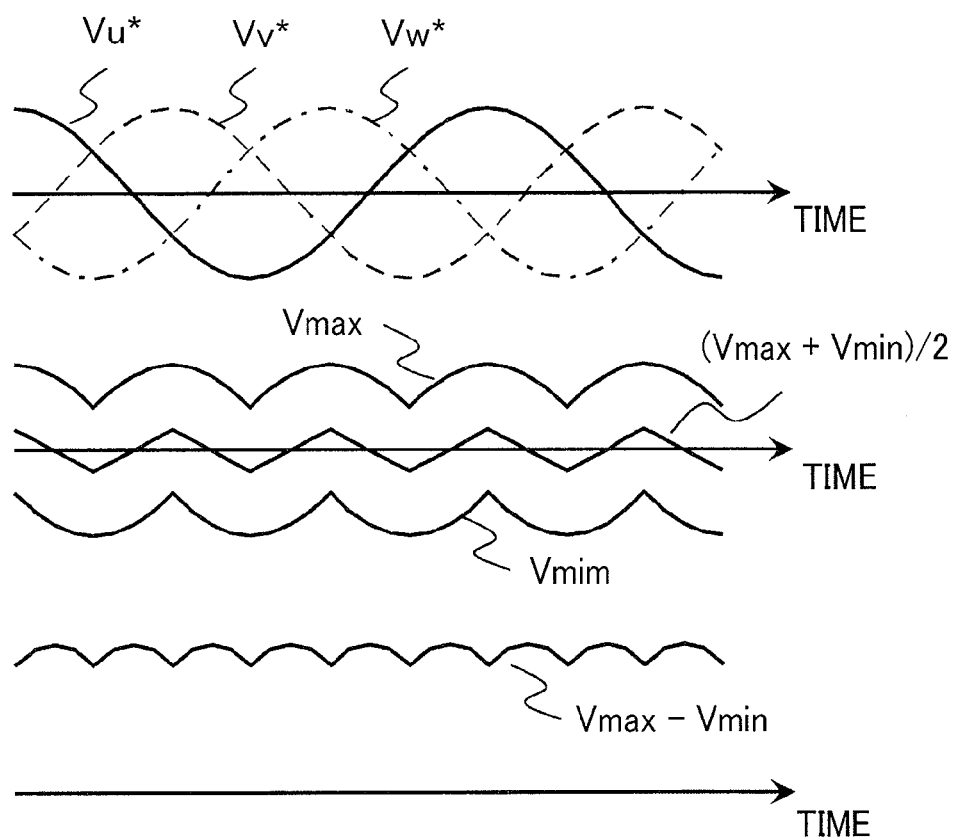
FIG. 6 is an example of a time chart according to Embodiment 1 of the invention.

FIG. 6, plotting time as the abscissa, plots relations among the three-phase voltage commands Vu*, Vv*, Vw*, the maximum value Vmax and the minimum value Vmin, (Vmax+Vmin)/2, and the difference between the maximum value Vmax and the minimum value Vmin (Vmax−Vmin).

Vdc is a constant in Equation (9) for computing the first superimposed voltage command Vx1*. Moreover as seen from FIG. 6, Vmax demonstrates a curve varying continuously with respect to time on the abscissa without discontinuing along the way. Since Equation (9) for computing the first superimposed voltage command Vx1* includes Vdc that is the constant and Vmax varying continuously with respect to time, Equation (9) is also an equation for computing the superimposed voltage command varying continuously with respect to time.

In the conventional power inverter, the superimposed voltage command is varied rectangularly with respect to time so that switching at each phase of the inverter is stopped alternately for a predetermined time; therefore, current ripples occur at discontinuities with respect to time, causing a problem with increasing noise and vibration.

When the first superimposed voltage command Vx1* is given to the superimposed voltage command Vx* as described in this Embodiment, the superimposed voltage command computing means 4 outputs the superimposed voltage command Vx* in such a way that the maximum value of the modified three-phase voltage commands Vu0*, Vv0*, Vw0* becomes the first constant (0.4×Vdc); therefore, the first superimposed voltage command Vx1* can be given continuously with respect to time, and as a result, the modified three-phase voltage commands also vary continuously with respect to time, thereby bringing about an effect in which the occurrence of the current ripples can be suppressed.

Similarly, Vdc is a constant in Equation (10) for computing the second superimposed voltage command Vx2*. As seen from FIG. 6, Vmin demonstrates a curve varying continuously with respect to time without discontinuing along the way. Therefore, Equation (10) for computing the second superimposed voltage command Vx2* is also an equation for computing the superimposed voltage command varying continuously with respect to time. Similarly to Equation (9) for computing the first superimposed voltage command Vx1*, an effect is brought about in which the occurrence of the current ripples can be suppressed.

Similarly, as seen from FIG. 6, in Equation (11) for computing the third superimposed voltage command Vx3*, (Vmax+Vmin)/2 demonstrates a curve varying continuously with respect to time without discontinuing along the way. Therefore, Equation (11) for computing the third superimposed voltage command Vx3* is also an equation for computing the superimposed voltage command varying continuously with respect to time.

In the conventional power inverter, there has been a problem in that when the superimposed voltage command has discontinuities, those discontinuities cause current ripples to occur, thereby increasing noise and vibration. The superimposed voltage command computing means 4 of this Embodiment is provided with Equations (9)-(11) for computing the superimposed voltage command Vx* varying continuously with respect to time; therefore whichever equation is selectively used out of Equations (9)-(11), the discontinuities do not appear with respect to time. Therefore, there is brought about an effect of enabling the current ripples to be suppressed that have occurred in the conventional power inverter attributed to the discontinuities with respect to time.

Moreover, the selector 44 of this Embodiment selects any one out of the first superimposed voltage command Vx1*, the second superimposed voltage command Vx2* and the third superimposed voltage command Vx3* depending on the difference between the maximum voltage Vmax and the minimum voltage Vmin (Vmax−Vmin) described in FIG. 5, and outputs the result as the superimposed voltage command Vx*.

The first superimposed voltage command Vx1* is switched over from the first superimposed voltage command Vx1* to the second superimposed voltage command Vx2* at a time when the difference between the maximum voltage Vmax and the minimum voltage Vmin (Vmax−Vmin) becomes 0.9×Vdc. When the difference between the maximum voltage Vmax and the minimum voltage Vmin (Vmax−Vmin) becomes 0.9×Vdc at time t1, the first superimposed voltage command Vx1*(t1) at time t1 is given by Equation (12) that is obtained by substituting the relation (Vmax−Vmin=0.9×Vdc) for Equation (9).

$$Vx1^*(t1)=0.4 \times Vdc-(Vmin+0.9 \times Vdc)=-0.5 \times Vdc-Vmin \qquad (12)$$

Equation (12) is the same as Equation (10) for computing the second superimposed voltage command Vx2*. Even if the selector 44 switches at time t1 its selecting superimposed voltage command Vx* from the first superimposed voltage command Vx1* to the second superimposed voltage command Vx2*, the superimposed voltage command can remain continuous with respect to time. The reason therefor is that the first superimposed voltage command Vx1* is switched over to the second superimposed voltage command Vx2* under the condition that the difference between the maximum voltage Vmax and the minimum voltage Vmin (Vmax−Vmin) is set to 0.9×Vdc, taking into consideration equations for computing the first superimposed voltage command Vx1* and the second superimposed voltage command Vx2*. Moreover, the second superimposed voltage command Vx2*(t1) at time t1 is given by Equation (13) that is obtained by substituting the relation (Vmax−Vmin=0.9×Vdc) for Equation (10).

$$Vx2^*(t1)=-0.5 \times Vdc-(Vmax-0.9 \times Vdc)=0.4 \times Vdc-Vmax \qquad (13)$$

As described above, even if the selector 44 switches over at time t1 the selecting superimposed voltage command Vx* from the second superimposed voltage command Vx2* to the first superimposed voltage command Vx1*, the superimposed voltage command can be varied continuously with respect to time.

The second superimposed voltage command Vx2* is switched over to the third superimposed voltage command Vx3* at a time when the difference between the maximum voltage and the minimum voltage (Vmax−Vmin) becomes 1.0×Vdc. When the difference between the maximum voltage and the minimum voltage (Vmax−Vmin) becomes 1.0×Vdc at time t2, the second superimposed voltage command Vx2*(t2) at time t2 is given by Equation (14) that is obtained by substituting the relation (Vmax−Vmin=1.0×Vdc) for Equation (10).

$$Vx2^*(t2)=-0.5 \times Vdc-(Vmax-1.0 \times Vdc)=0.5 \times Vdc-Vmax \qquad (14)$$

Similarly, when the difference between the maximum voltage and the minimum voltage (Vmax−Vmin) becomes 1.0×Vdc at time t2, the third superimposed voltage command Vx3*(t2) at time t2 is given by Equation (15) that is obtained by substituting the relation (Vmax−Vmin=1.0×Vdc) for Equation (11).

$$Vx3^*(t2)=-0.5 \times \{Vmax+(Vmax-1.0 \times Vdc)\}=0.5 \times Vdc-Vmax \qquad (15)$$

Equation (15) is the same as Equation (14) for computing the second superimposed voltage command Vx2*. Even if the selector 44 switches over at time t2 the selecting superimposed voltage command Vx* from the second superimposed voltage command Vx2* to the third superimposed voltage command Vx3*, the superimposed voltage command can remain continuous with respect to time. The reason therefor is that the second superimposed voltage command Vx2* is switched over to the third superimposed voltage command Vx3* under the condition that the difference between the maximum voltage and the minimum voltage (Vmax−Vmin) is set to 1.0×Vdc, taking into consideration equations for computing the second superimposed voltage command Vx2* and the third superimposed voltage command Vx3*.

As described above, even if the selector 44 switches over at time t2 the selecting superimposed voltage command Vx* from the second superimposed voltage command Vx2* to the third superimposed voltage command Vx3*, or to the contrary, even if the selector 44 switches at time t2 the superimposed voltage command Vx* from the third superimposed voltage command Vx3* to the second superimposed voltage command Vx2*, the superimposed voltage command can be varied continuously with respect to time.

In the conventional power inverter, the sums of the switching loss by each switching element and the ohmic loss by each current detection resister are compared with each other so as to select an equation for computing the superimposed voltage command; therefore, the superimposed voltage command has discontinuities, which has caused current ripples, thereby causing a problem with increasing noise and vibration. The superimposed voltage command computing means 4 of this Embodiment selectively switches over the equations for computing the superimposed voltage command so that the superimposed voltage command Vx* varies continuously with respect to time; therefore, an effect can be brought about in which the current ripples can be suppressed even at a timing when the equations for computing the superimposed voltage command are switched over from one to another.

As described above, conditions, such as easiness of current detection, ohmic loss by the current detection resisters and voltage distortion when over-modulation occurs, vary depending on the difference between the maximum and minimum values. In this Embodiment 1, the power inverter 2 that outputs the three-phase voltages Vu, Vv, Vw based on the modified three-phase voltage commands Vu0*, Vv0*, Vw0* includes the superimposed voltage command computing means 4 for computing and outputting the superimposed voltage command Vx*; the voltage command modification means 5 for adding the superimposed voltage command Vx* to each of the three-phase voltage commands Vu*, Vv*, Vw* and outputting the modified three-phase voltage commands Vu0*, Vv0*, Vw0*; and the voltage output means 6 for outputting the three-phase voltages based on the modified three-phase voltage commands Vu0*, Vv0*, Vw0*; wherein the superimposed voltage command computing means 4 outputs the superimposed voltage command Vx* depending on the difference between the maximum value Vmax and the minimum value Vmin of the three-phase voltage commands Vu*, Vv*, Vw* (Vmax−Vmin). Therefore, there is brought about such an effect as high voltages can be output with low loss.

Embodiment 2

In the foregoing Embodiment 1, the superimposed voltage command computing means outputs the first superimposed voltage command Vx1* as the superimposed voltage command Vx* when the difference between the maximum value Vmax and the minimum value Vmin of the three-phase voltage commands (Vmax−Vmin) is smaller than 0.9×Vdc; however, the superimposed voltage command Vx* may be made zero if the amplitudes of the three-phase voltage commands are within a range of no voltage saturation occurring.

When the superimposed voltage command is made zero, the modified three-phase voltage commands and the three-phase voltages the voltage output means 6 outputs can be made sinusoidal. Moreover, when the resolution of the voltages the voltage output means can output is limited due to digital processing and the like, if the first superimposed voltage command Vx1* is given to the superimposed voltage command Vx* in a range where the amplitude of each of the three-phase voltage commands is low, the amplitude of each of the modified three-phase voltage commands is further lowered so that the accuracy of the voltage output means is reduced; however, if the superimposed voltage command is made zero in the range where the amplitude of each of the three-phase voltage commands is low, the amplitude of each of the modified three-phase voltage commands can be prevented from further lowering. In this Embodiment 2, a configuration for making the superimposed voltage command zero in the range where the amplitude of each of the three-phase voltage commands is low will be explained.

In this Embodiment 2, the superimposed voltage command computing means 4 in the foregoing embodiment is replaced with a superimposed voltage command computing means 4*a* (not shown in the figure). The superimposed voltage command computing means 4*a* includes a superimposed voltage command computing unit 8*a* described in FIG. 7.

Figure 7:
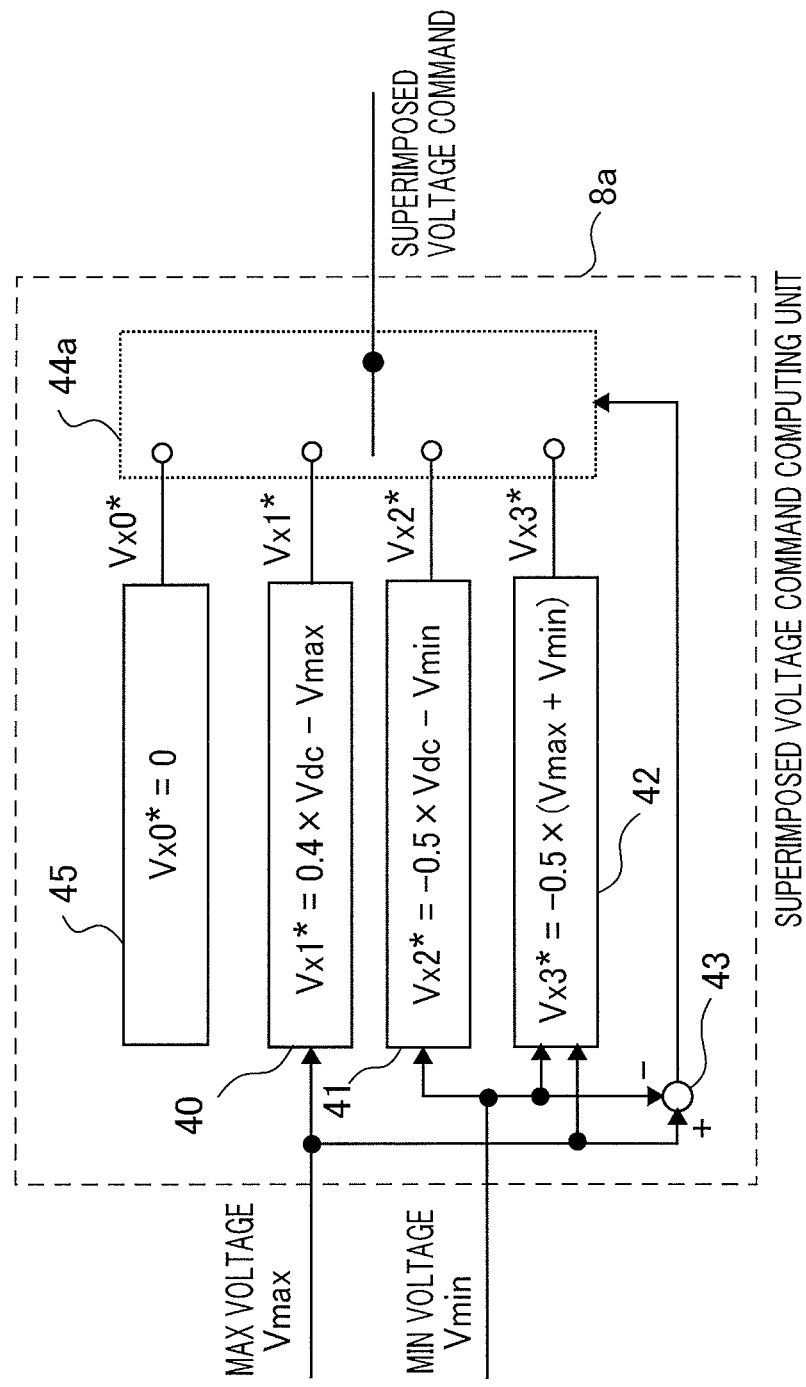
FIG. 7 is a diagram showing the internal configuration of a superimposed voltage command computing unit 8a according to Embodiment 2 of the invention.

FIG. 7 is a diagram showing the internal configuration of the superimposed voltage command computing unit 8*a* according to Embodiment 2 of the present invention. The same reference numerals as those of Embodiment 1 represent the same or corresponding components.

A zero superimposed voltage command computing unit 45 gives zero to a zero superimposed voltage command Vx0* so that the superimposed voltage command becomes zero, and outputs the result. A selector 44*a* selects any one out of the zero superimposed voltage command Vx0*, the first superimposed voltage command Vx1*, the second superimposed voltage command Vx2* and the third superimposed voltage command Vx3*, depending on the difference between the maximum voltage Vmax and the minimum voltage Vmin, the first superimposed voltage command Vx1* and the second superimposed voltage command Vx2*, and outputs the result as the superimposed voltage command Vx*. The selector 44*a* selects the superimposed voltage command depending on the difference between the maximum value Vmax and the minimum value Vmin of the three-phase commands; the selection process follows FIG. 8.

Figure 8:
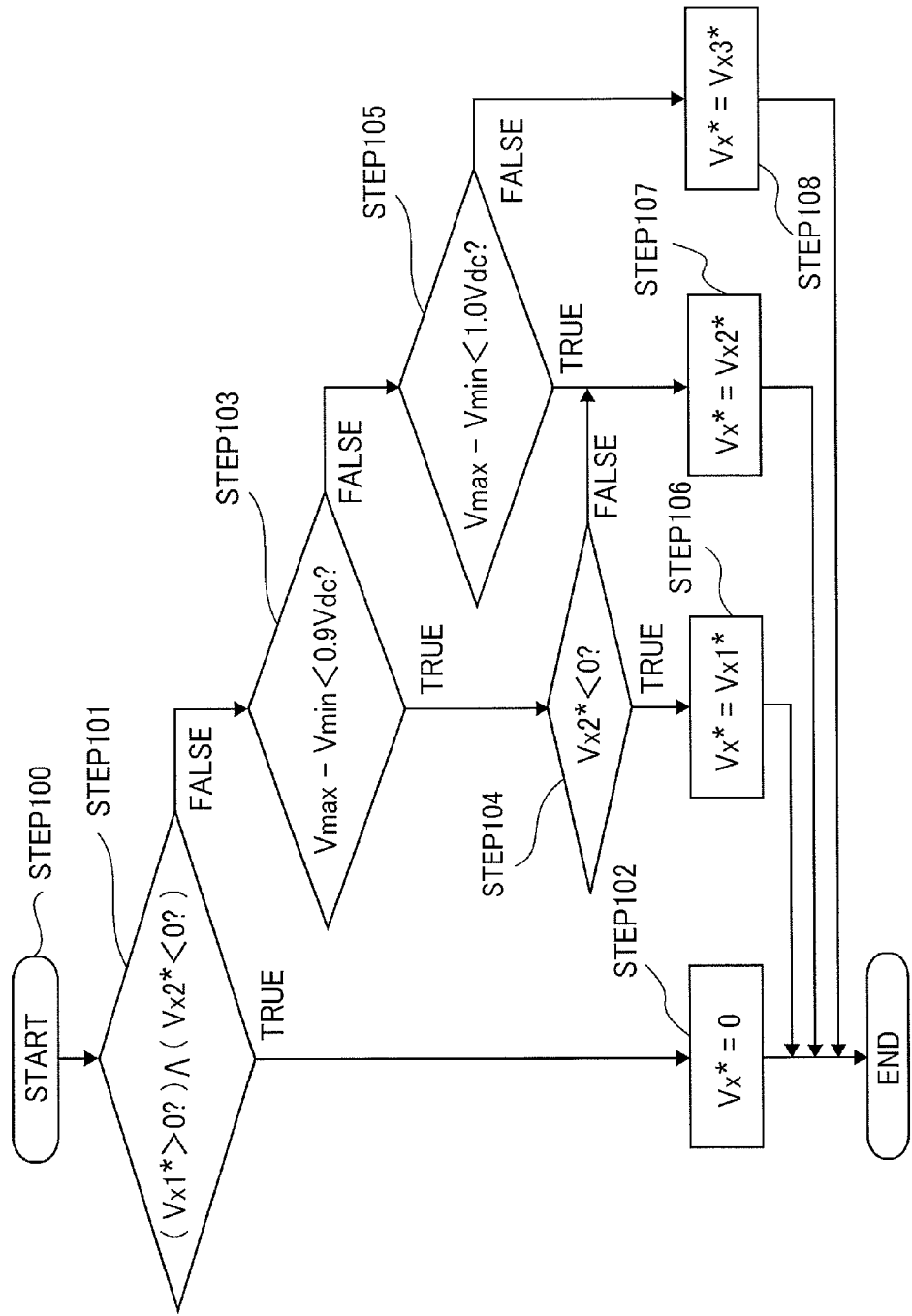
FIG. 8 is a flowchart showing a process in which a selector 44a according to Embodiment 2 of the invention selects and outputs a superimposed voltage command.

FIG. 8 is a flowchart showing the process in which the selector 44*a* selects and outputs the superimposed voltage command Vx* out of the zero superimposed voltage command Vx0*, the first superimposed voltage command Vx1*, the second superimposed voltage command Vx2* and the third superimposed voltage command Vx3*.

Computing of the selector 44*a* starts from Step 100 in FIG. 8.

"Whether or not the first superimposed voltage command Vx1* is positive" and "whether or not the second superimposed voltage command Vx2* is negative" are determined in Step 101. If the first superimposed voltage command Vx1* is positive, Equation (16) is true from Equation (9).

$$V\text{max} < 0.4 \times Vdc \tag{16}$$

As explained in FIG. 3, when Equation (16) is satisfied, since the maximum phase voltage is lower than 0.4×Vdc, not only voltage saturation does not occur in the phase of the maximum phase voltage, but also a current detection period therefor can be secured.

Similarly, if the second superimposed voltage command Vx2* is negative, Equation (17) is true from Equation (10).

$$V\text{min} > -0.5 \times Vdc \tag{17}$$

If Equation (17) is satisfied, since the minimum phase voltage is larger than −0.5×Vdc, voltage saturation does not occur at the phase corresponding to the minimum phase voltage.

As described above, "whether Vmax<0.4×Vdc" and "whether Vmin>−0.5×Vdc" are determined in Step 101. If those inequalities are satisfied, voltage saturation does not occur at both maximum and minimum voltages; therefore, the saturation does not occur at any one of the three phases even if the superimposed voltage command is zero, whereby the current detection periods can be secured. If Step 101 is true, processing in Step 102 is executed, whereas if it is false, processing in Step 103 is executed.

In Step 102, the selector 44*a* executes processing of selecting and outputting as the superimposed voltage command Vx* the zero superimposed voltage command Vx0*.

In Step 103, whether or not the difference between the maximum value Vmax and the minimum value Vmin of the three-phase voltage commands (Vmax−Vmin) exceeds 0.9×Vdc is determined. If the difference (Vmax−Vmin) does not exceed 0.9×Vdc, processing in Step 104 is executed, whereas if it exceeds 0.9×Vdc, processing in Step 105 is executed. In the processing in Step 103, as described above, the first superimposed voltage command is selectively used in a range where (Vmax−Vmin) is smaller than 0.9×Vdc.

"Whether Vx2*<0" is determined in Step 104. The superimposed voltage command computing means 4a of this Embodiment 2, similarly to the foregoing Embodiment 1, also selectively switches over the equations for computing the superimposed voltage command so that the superimposed voltage command Vx* varies continuously with respect to time. At the moment when Step 101 changes from true to false or vice versa, the truth/false of either "Vx1*>0" or "Vx2*<0" changes. Moreover, when the processing in Step 104 is executed, the processing in Step 101 must have been completed; therefore at least either "Vx1*>0" or "Vx2*<0" is false. Therefore, if "Vx2*<0" is true in Step 104, "Vx1*>0" is false in Step 101 and the processing in Step 104 is determined to have been executed so that processing in Step 106 is executed. Moreover, if "Vx2*<0" is false in Step 104, "Vx2*<0" is false in Step 101 and the processing in Step 104 is determined to have been executed so that processing in Step 107 is executed. In Step 107, as will be described later, the first superimposed voltage command Vx1* is output as the superimposed voltage command Vx*.

As has been explained in the foregoing embodiment, in Step 103, the superimposed voltage command Vx* is switched over between the first superimposed voltage command Vx1* and the second superimposed voltage command Vx2* under the condition that the quantitative relation between (Vmax−Vmin) and 0.9×Vdc changes in Step 103; therefore, the superimposed voltage command Vx* can vary continuously with respect to time. Moreover, the processing in Step 106 is executed when "Vx1*>0" is false in Step 101; therefore the quantitative relation between Vx1* and zero changes in Step 101 when Vx1* becomes zero (Vx1*=0). That is to say, in Step 101, the superimposed voltage command Vx* is also switched over between the zero superimposed voltage command Vx0* and the first superimposed voltage command Vx1* under the condition that the quantitative relation between the first superimposed voltage command Vx1* and zero changes; therefore, the superimposed voltage command Vx* can vary continuously with respect to time even under the condition that the quantitative relation between Vx1* and zero changes.

In Step 105, whether or not the difference between the maximum value Vmax and the minimum value Vmin of the three-phase voltage commands (Vmax−Vmin) exceeds 1.0×Vdc is determined. If the difference (Vmax−Vmin) does not exceed 1.0×Vdc, the processing in Step 107 is executed, whereas if it exceeds 1.0×Vdc, processing in Step 108 is executed.

In Step 107, the first superimposed voltage command Vx1* is output as the superimposed voltage command Vx*. As explained in the foregoing embodiment, the superimposed voltage command Vx* is switched over between the second superimposed voltage command Vx2* and the third superimposed voltage command Vx3* based on the quantitative relation between the difference between the maximum value Vmax and the minimum value Vmin of the three-phase voltage commands (Vmax−Vmin) and 1.0×Vdc; therefore, the superimposed voltage command Vx* can vary continuously with respect to time under the condition that the quantitative relation between (Vmax−Vmin) and 1.0×Vdc changes. Moreover, the processing in Step 107 is also executed even when Step 104 becomes false. In this case, "Vx2*<0" is false in Step 101; the quantitative relation between Vx2* and zero changes in Step 101 when Vx2* becomes zero (Vx2*=0). That is to say, in Step 101, the superimposed voltage command Vx* is switched over between the zero superimposed voltage command Vx0* and the second superimposed voltage command Vx2* under the condition that the quantitative relation between Vx2* and zero changes; therefore, the superimposed voltage command Vx* can vary continuously with respect to time even under the condition that the quantitative relation between Vx2* and zero changes.

In Step 108, since the difference between the maximum value Vmax and the minimum value Vmin of the three-phase voltage commands (Vmax−Vmin) exceeds 1.0×Vdc, the third superimposed voltage command Vx3*, similarly to the foregoing embodiment, is output as the superimposed voltage command Vx*.

In the conventional power inverter, the sums of power loss are compared with each other so as to select an equation for computing a superimposed voltage command that gives smaller loss; therefore, the superimposed voltage command becomes discontinuous at the time of switching over the equations, which has caused such a problem as current distortion occurring. In a power inverter according to this Embodiment 2, the superimposed voltage command Vx* is varied continuously with respect to time at any time when the command is switched over between the zero superimposed voltage command Vx0* and the first superimposed voltage command Vx1*, between the zero superimposed voltage command Vx0* and the second superimposed voltage command Vx2*, between the first superimposed voltage command Vx1* and the second superimposed voltage command Vx2*, and between the second superimposed voltage command Vx2* and the third superimposed voltage command Vx3*; therefore an effect can be brought about in which a problem attributed to the discontinuities can be resolved.

Moreover, since the superimposed voltage command computing unit 4a according to this Embodiment 2 determines whether or not to make the superimposed voltage command Vx* zero, based on the maximum value Vmax and the minimum value Vmin of the three-phase voltage commands, sinusoidally-varying phase voltages can be output when the voltage amplitudes are low. Moreover, in a range where the amplitudes of three-phase voltage commands Vu*, Vv*, Vw* are low, the amplitudes of the modified three-phase voltage commands Vu0*, Vv0*, Vw0* can be prevented from further lowering; therefore even when the resolution of the voltages the power output means 6 can output is limited due to digital processing and the like, an effect can be brought about in which the power output means can accurately output the voltages while suppressing the impact of the limited resolution.

Embodiment 3

In the flowchart of FIG. 8 according to the foregoing Embodiment 2, whether or not the difference between the maximum value Vmax and the minimum value Vmin of the three-phase voltage commands (Vmax−Vmin) exceeds 0.9×Vdc is determined in Step 103. If the difference (Vmax−Vmin) does not exceed 0.9×Vdc, the processing in Step 104 is executed, whereas if it exceeds 0.9×Vdc, the processing in Step 105 is executed.

Now, another expression for the difference between the maximum value Vmax and the minimum value Vmin of the three-phase voltage commands (Vmax−Vmin) will be considered. Equation (18) is obtained by subtracting Equation (9) from Equation (10).

$$Vx2^* - Vx1 = (Vmax - Vmin) - 0.9 \times Vdc \quad (18)$$

As seen from Equation (18), Inequality (19) is true as an inequality expressing the relation between the difference between the maximum value Vmax and the minimum value Vmin of the three-phase voltage commands (Vmax−Vmin) and 0.9×Vdc.

$$Vmax - Vmin < 0.9 \times Vdc \Leftrightarrow Vx2^* - Vx1^* < 0 \quad (19)$$

That is, it does not make any difference even if determination Inequality "Vmax−Vmin<0.9×Vdc" is replace with Inequality "Vx2*−Vx1*<0" in Step 103 according to Embodiment 2; even if this replacement is provided in Step 3, the superimposed voltage command can be computed depending on the difference between the maximum value Vmax and the minimum value Vmin of the three-phase voltage commands.

Moreover, in the flowchart of FIG. 8 according to the foregoing Embodiment 2, whether or not the difference between the maximum value Vmax and the minimum value Vmin of the three-phase voltage commands (Vmax−Vmin) exceeds 1.0×Vdc is determined in Step 105. If the difference (Vmax−Vmin) does not exceed 1.0×Vdc, the processing in Step 107 is executed, whereas if it exceeds 1.0×Vdc, the processing in Step 108 is executed.

Similarly to Step 103, another expression for the difference between the maximum value Vmax and the minimum value Vmin of the three-phase voltage commands (Vmax−Vmin) will be considered here. Equation (20) is obtained by subtracting Equation (11) from Equation (10).

$$Vx2^* - Vx3^* = 0.5 \times \{(Vmax - Vmin) - 1.0 \times Vdc\} \quad (20)$$

As seen from Equation (20), Inequality (21) is true as an inequality expressing the relation between the difference between the maximum value Vmax and the minimum value Vmin of the three-phase voltage commands (Vmax−Vmin) and 1.0×Vdc.

$$Vmax - Vmin < 1.0 \times Vdc \Leftrightarrow Vx2^* - Vx3^* < 0 \quad (21)$$

That is, it does not make any difference even if determination Inequality "Vmax−Vmin<1.0×Vdc" is replace with Inequality "Vx2*−Vx3*<0" in Step 105 according to Embodiment 2. Even if this replacement is provided in Step 5, the superimposed voltage command can be computed depending on the difference between the maximum value Vmax and the minimum value Vmin of the three-phase voltage commands.

The power inverter according to this Embodiment 3 has been equivalently transformed from that described in the foregoing Embodiment 2; it goes without saying that the same effects as those in Embodiment 2 can be brought about.

Embodiment 4

In the foregoing Embodiment 2, whether or not to make the superimposed voltage command Vx* zero is determined based on the maximum voltage Vmax and the minimum voltage Vmin of the three-phase voltage commands.

In this Embodiment 4, the superimposed voltage command computing means 4 according to the foregoing embodiments is replaced with a superimposed voltage command computing means 4b, which is configured in such a way that whether or not to make the superimposed voltage command Vx* zero is determined based on the frequency of the voltage commands, so as to reduce the computation amount.

Figure 9:
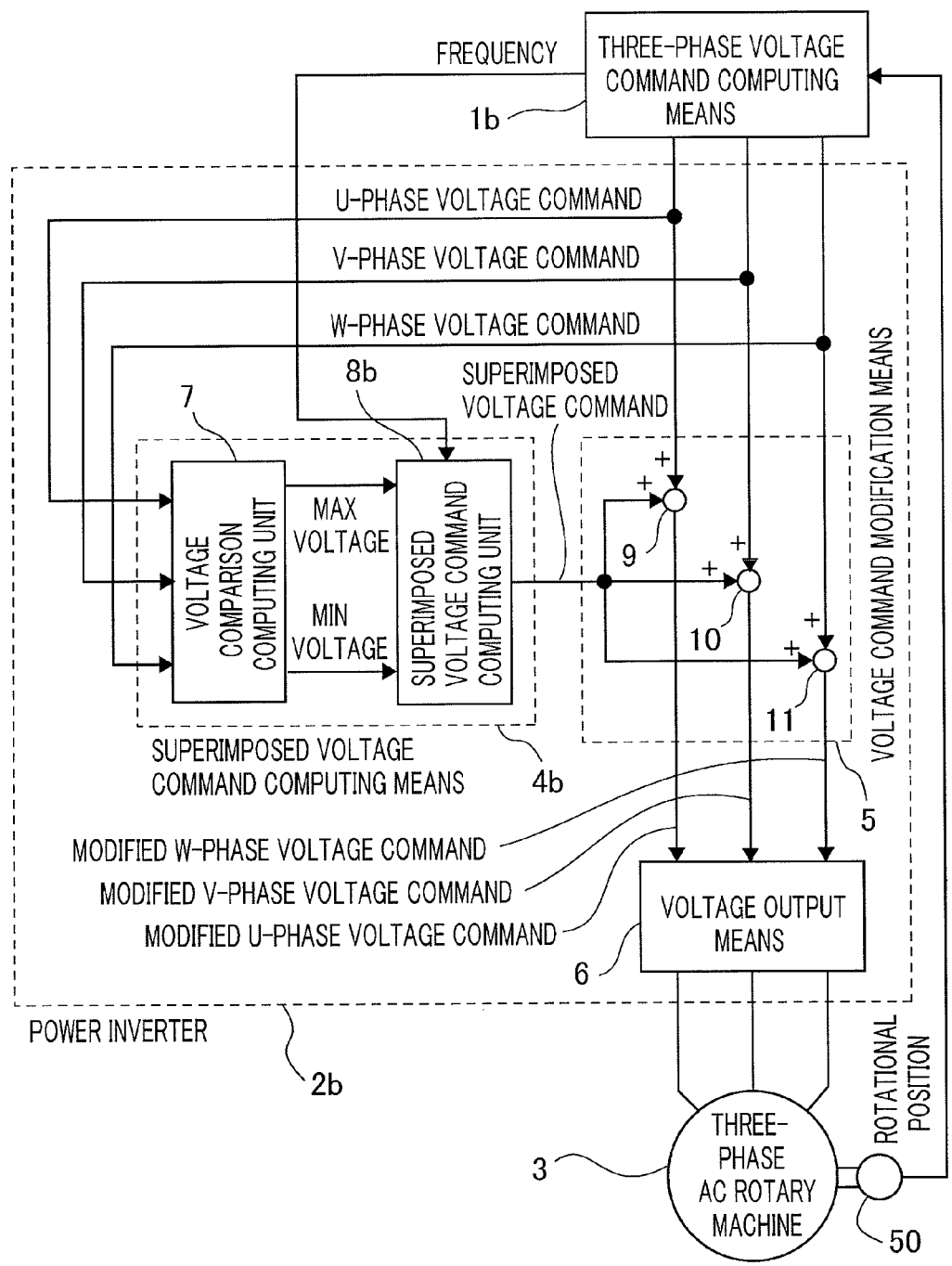
FIG. 9 is a diagram showing the entire configuration of a power inverter 2b according to Embodiment 4 of the invention.

FIG. 9 is a diagram showing the entire configuration of a power inverter 2b according to Embodiment 4 of the present invention; the same reference numerals as those of the foregoing embodiments represent the same or corresponding components.

A rotational position detector 50 detects a rotational position of the three-phase AC rotary machine 3, and outputs the detected rotational position to a three-phase voltage command computing means 1b. The three-phase voltage command computing means 1b outputs to a power inverter 2b the frequency of outputting three-phase voltage commands. The frequency may be the one corresponding to the frequency of the three-phase voltage commands and can be given by a phase change rate, a change rate of the rotational position, or a target frequency command, which are used for coordinate transform widely known as a method of creating the three-phase voltage commands.

The frequency is input to the superimposed voltage command computing means 4b of the power inverter 2b. A superimposed voltage command computing unit 8b provided in the superimposed voltage command computing means 4b computes the superimposed voltage command Vx* based on the frequency.

Figure 10:
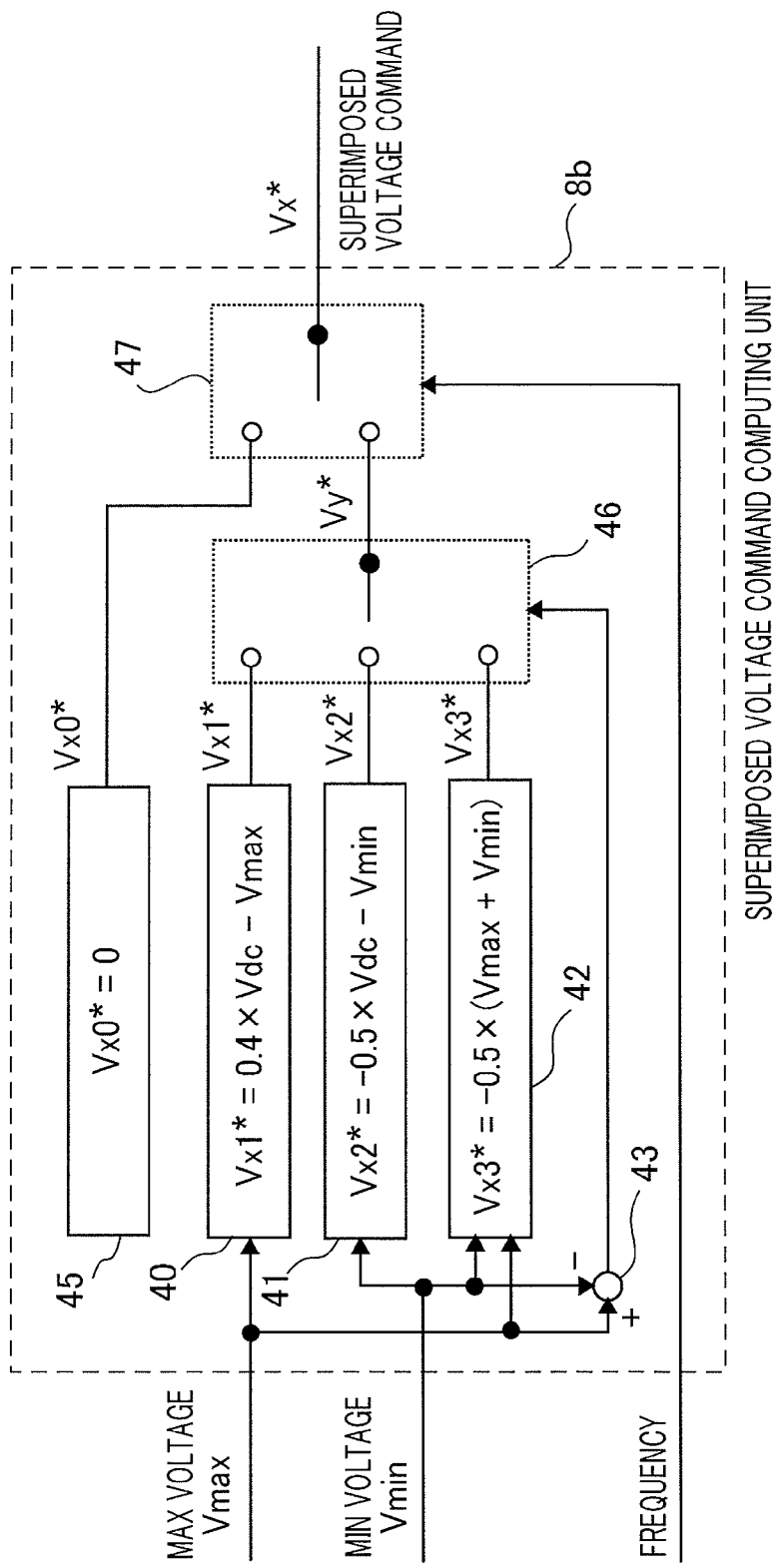
FIG. 10 is a diagram showing the internal configuration of a superimposed voltage command computing unit 8b according to Embodiment 4 of the invention.

FIG. 10 is a diagram showing the internal configuration of the superimposed voltage command computing unit 8b according to Embodiment 4 of the present invention; the same reference numerals as those of the foregoing embodiments represent the same or corresponding components.

A first selector 46 operates the same as the selector 44 according to the foregoing Embodiment 1; however they differ from each other in that the first selector 46 does not output Vx* but a selected superimposed voltage command Vy*, which is input to a second selector 47.

The second selector 47 selects based on the frequency either the zero superimposed voltage command Vx0* the zero superimposed voltage command computing unit 45 outputs or the selected superimposed voltage command Vy*, and outputs the result as the superimposed voltage command Vx*.

In the foregoing Embodiment 2, whether or not to make the superimposed voltage command Vx* zero is determined based on the maximum value Vmax and the minimum value Vmin of the three-phase voltage commands; however in this Embodiment 4, whether or not to make Vx* zero is determined based on the frequency.

Induced voltages by the three-phase AC rotary machine are proportional to a change rate of magnetic flux generated in the three-phase AC rotary machine; the higher the induced voltages, the higher the voltages applied to the three-phase AC rotary machine. Taking into consideration the fact that the change rate of the magnetic flux generated in the three-phase AC rotary machine is nearly proportional to the frequency of the three-phase voltage commands, whether or not the amplitudes of the three-phase voltage commands are low may be determined based on the frequency of the voltage commands.

Although the three-phase voltage commands include three values of the U-phase, V-phase and W-phase, their frequencies are the same. Therefore, if whether or not to make the superimposed voltage command Vx* zero is determined based on the frequency of the three-phase voltage commands, an effect can be brought about in which computing for making the determination can be more simplified than that based on the maximum value Vmax and the minimum value Vmin of the three-phase voltage commands.

Embodiment 5

Although explanations have been focused on the power inverters in the foregoing embodiments, an electric power steering system that produces torque for assisting steering torque may be configured using the same.

Figure 11:
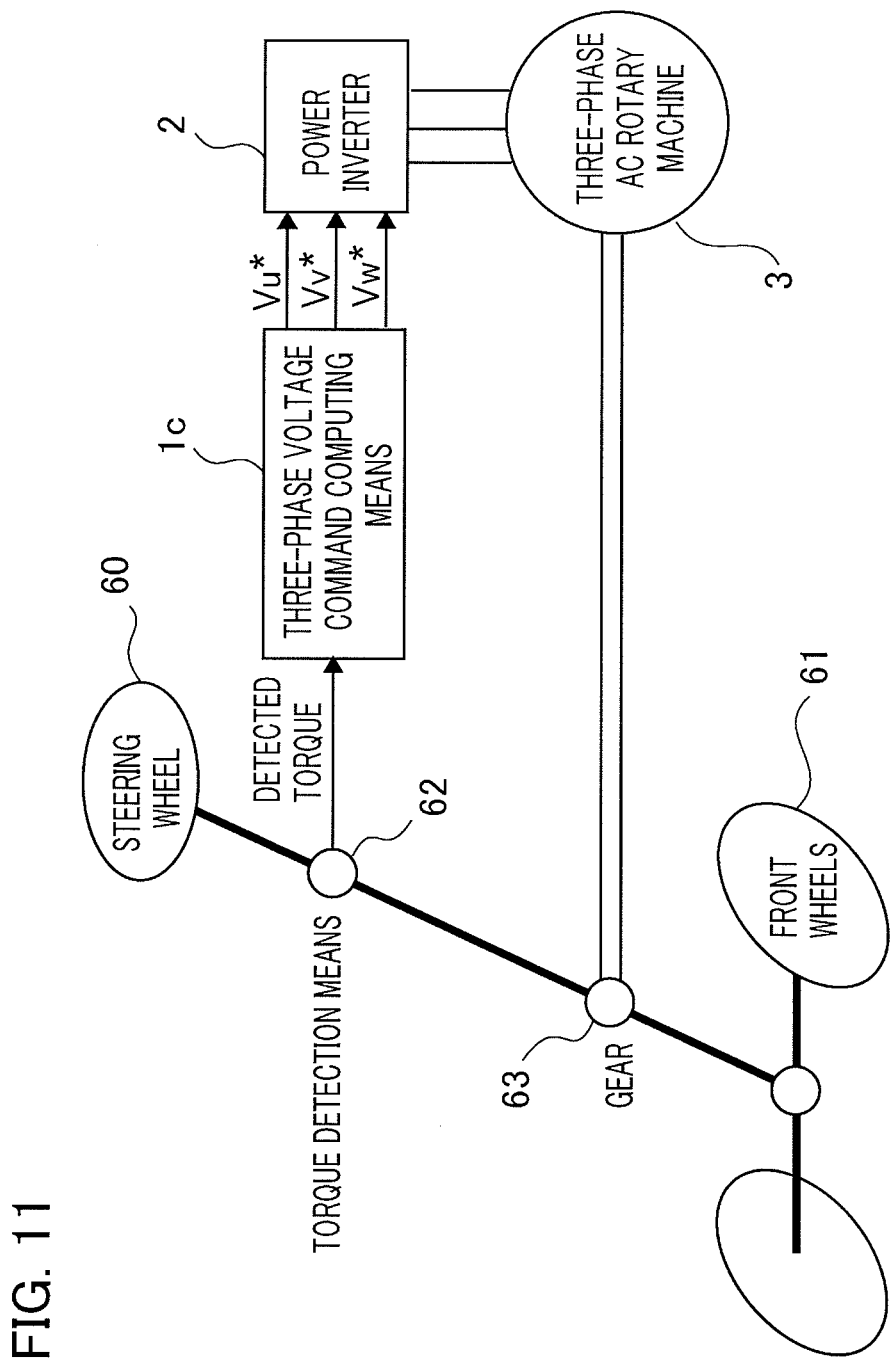
FIG. 11 is a diagram showing the configuration of an electric power steering system according to Embodiment 5 of the invention.

FIG. 11 is a diagram showing the configuration of the electric power steering system according to Embodiment 5 of the present invention; the same reference numerals as those of the foregoing embodiments represent the same or corresponding components. A driver turns a steering wheel clockwise or counterclockwise so as to steer front wheels 61. A torque detection means 62 detects steering torque from the steering system and outputs the detected torque to a three-phase voltage command computing means 1c. The three-phase voltage command computing means 1c computes the three-phase voltage commands Vu*, Vv*, Vw* and outputs the result to the power inverter 2 so that the three-phase AC rotary machine 3 produces torque that assists based on the detected torque steering torque from the steering system. The power inverter 2 outputs three-phase voltages Vu, Vv, Vw to the three-phase AC rotary machine 3 based on the three-phase voltage commands Vu*, Vv*, Vw*, and the three-phase AC rotary machine 3 thereby produces the torque. This torque assists via a gear 63 the steering torque from the steering system.

In an electric power steering controller using as the power source 21a low voltage battery such as 12V one, voltage saturation occurs more easily compared with a controller in which a three-phase AC rotary machine is driven by a high voltage power source. However as described above, the power inverter 2 provided in the electric power steering controller according to this Embodiment brings about an effect of enabling a high voltage to be output with low loss; therefore, the three-phase AC rotary machine 3 can be supplied with three-phase voltages of both small voltage saturation and small distortion at high output power. As a result, an effect can be brought about in which vibration attributed to voltage distortion is suppressed, whereby unpleasant feeling to the driver when holding the steering wheel can also be suppressed. Moreover, abnormal noise generated by the three-phase AC rotary machine 3 can be brought under control by suppressing the voltage distortion, so that another effect can be brought about in which unpleasant noise to the driver can be suppressed.

In the electric power steering controller according to this Embodiment 5, a case of using for its power inverter the power inverter 2 according to Embodiment 1 has been discussed; however it goes without saying that the same effect can be brought about even when power inverters according to other embodiments are employed.

Embodiment 6

In the foregoing Embodiment 4, the superimposed voltage command computing unit 8 according to Embodiment 1 is replaced with the superimposed voltage command computing unit 8b and whether or not to make Vx* zero is determined based on the frequency.

In this Embodiment 6, the superimposed voltage command computing unit 8b according to the foregoing Embodiment 4 is replaced with a superimposed voltage command computing unit 8c, and the superimposed voltage command Vx* is made zero in a low frequency range while maintaining based on the frequency the superimposed voltage command Vx* not to become discontinuous.

Figure 12:
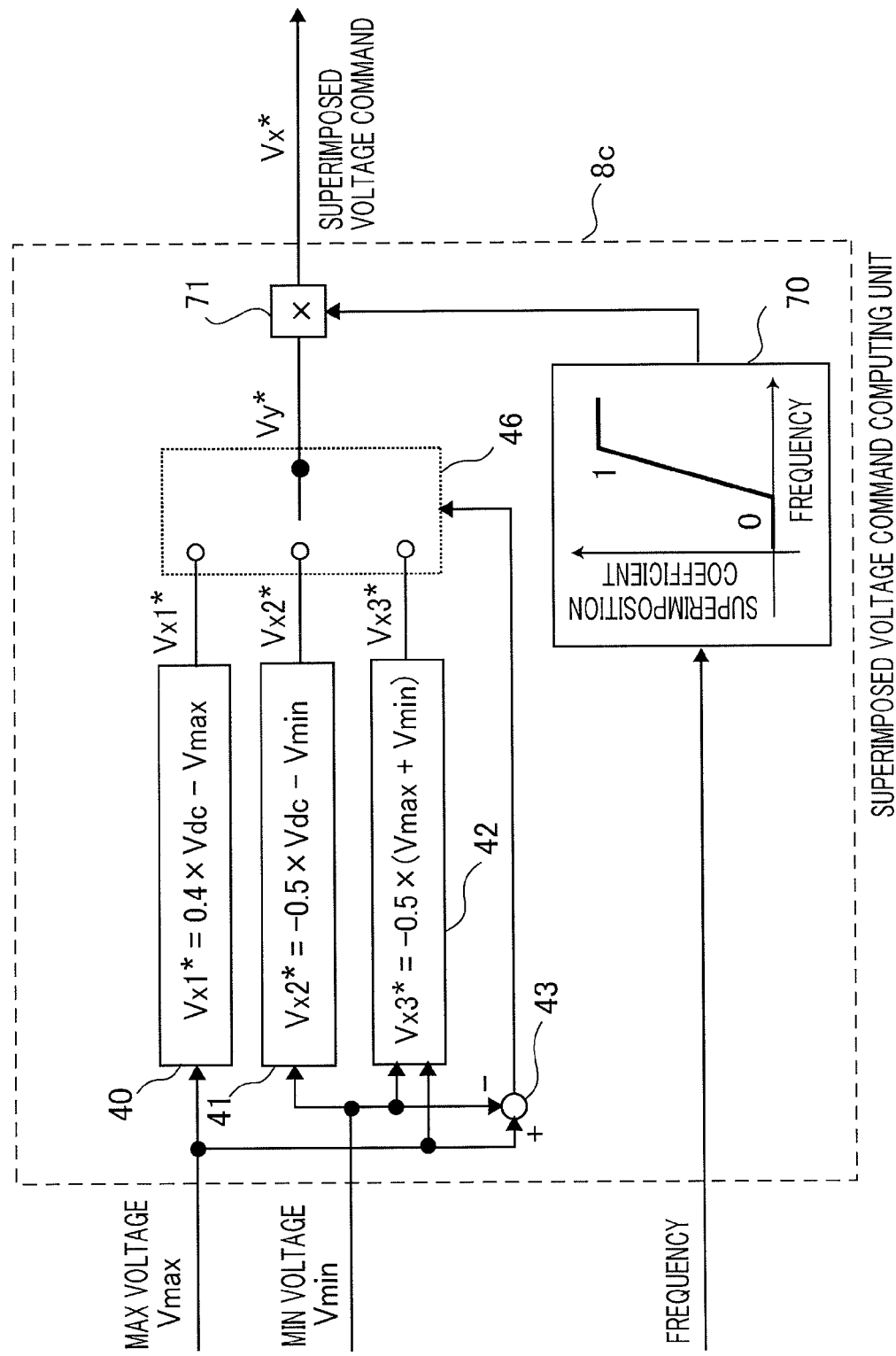
FIG. 12 is a diagram showing the internal configuration of a superimposed voltage command computing unit 8c according to Embodiment 6 of the invention.

FIG. 12 is a diagram showing the internal configuration of the superimposed voltage command computing unit 8c according to Embodiment 6 of the present invention. The same reference numerals as those of the foregoing Embodiment 4 represent the same or corresponding components.

A superimposition coefficient computing unit 70 outputs a superimposition coefficient based on the frequency. The superimposition coefficient computing unit 70 has stored in advance the relation between the frequency and the coefficient so that the coefficient varies continuously within a range of 0 to 1 with respect to its input frequency, based on which the unit outputs the superimposition coefficient. A multiplier 71 multiplies the coefficient the superimposition coefficient computing unit outputs and Vy* output from the first selector 46 together and outputs the result as the superimposed voltage command Vx*.

In this Embodiment 6, the superimposition coefficient computing unit 70 takes 0 for the coefficient when the frequency is low and takes 1 when it is high, and in addition, varies the coefficient continuously from 0 to 1 within the frequency band. By configuring such as the above, the superimposed voltage command Vx* can be made zero when the amplitudes of the three-phase voltage commands are within a range of voltage saturation not occurring.

As described above, the superimposition coefficient the superimposition coefficient computing unit 70 outputs can be plotted in a curved line continuously varying with respect to time. Therefore, since the superimposed voltage command Vx* also varies continuously with respect to time, an effect of suppressing the occurrence of current ripples can be brought about.

Various modifications and alterations of this invention will be apparent to those skilled in the art without departing from the scope and spirit of this invention, and it should be understood that this is not limited to the illustrative embodiments set forth herein.

What is claimed is:

1. A power inverter which is configured to convert based on three-phase voltage commands a DC voltage into three-phase voltages and outputs the voltages, the power inverter comprising:
   a superimposed voltage command computing device which is configured to compute and output a superimposed voltage command which is calculated using a difference between a maximum value and a minimum value of the three-phase voltage commands;
   a voltage command modification device which is configured to add the superimposed voltage command to each of the three-phase voltage commands and output modified three-phase voltage commands; and
   a power output which is configured to output the three-phase voltages based on the modified three-phase voltage commands.

2. A power inverter according to claim 1, wherein the superimposed voltage command computing device is configured to selectively switch over equations for computing the superimposed voltage command which is calculated using the difference between the maximum value and the minimum value of the three-phase voltage commands and output the superimposed voltage command.

3. A power inverter according to claim 1, wherein the superimposed voltage command computing device is provided with an equation for computing the superimposed voltage command varying continuously.

4. A power inverter according to claim 1, wherein the superimposed voltage command computing device is configured to selectively switch over equations for computing the superimposed voltage command so that the superimposed voltage command varies continuously.

5. A power inverter according to claim 1, wherein the superimposed voltage command computing device is configured to output the superimposed voltage command in such a way that a maximum value of the modified three-phase voltage commands becomes a maximum constant.

6. A power inverter according to claim 5, wherein the power output means takes ON/OFF control of semiconductor switches connected in series so as to convert the DC voltage into the three-phase voltages and output the voltages, and in addition, includes a current detector having a current detection resister for detecting a current connected between the semiconductor switches and the negative side of the DC voltage, and the superimposed voltage command computing device is configured to make the first constant a value based on a lower limit of a conductive period in which the current detector can detect the current.

7. A power inverter according to claim 1, wherein the superimposed voltage command computing device is configured to output the superimposed voltage command in such a way that a minimum value of the modified three-phase voltage commands becomes a minimum constant.

8. A power inverter according to claim 1, wherein the superimposed voltage command computing device is configured to make the superimposed voltage command an average of the maximum value and the minimum value of the three-phase voltage commands.

9. A power inverter according to claim 1, wherein the superimposed voltage command computing device is configured to determine, based on the maximum value and the minimum value of the three-phase voltage commands, whether or not to make the superimposed voltage command zero.

10. A power inverter according to claim 1, wherein the superimposed voltage command computing device is configured to determine, based on a frequency the power output means outputs, whether or not to make the superimposed voltage command zero.

11. A power inverter according to claim 2, wherein the superimposed voltage command computing device includes a selector that selectively outputs, depending on the difference between the maximum value and the minimum value of the three-phase voltage commands, a first superimposed voltage command computed based on the maximum value, a second superimposed voltage command computed based on the minimum value, or a third superimposed voltage command computed based on the maximum value and the minimum value.

12. A power inverter according to claim 2, wherein the superimposed voltage command computing means includes a selector that selectively outputs, depending on the difference between the maximum value and the minimum value of the three-phase voltage commands, a zero superimposed voltage command that makes the superimposed voltage command zero, a first superimposed voltage command computed based on the maximum value, a second superimposed voltage command computed based on the minimum value or a third superimposed voltage command computed based on the maximum value and the minimum value.

13. A power inverter according to claim 2, wherein the superimposed voltage command computing means includes a first selector that selectively outputs, as a selected superimposed voltage command, based on the difference between the maximum value and the minimum value of the three-phase voltage commands, a first superimposed voltage command computed based on the maximum value, a second superimposed voltage command computed based on the minimum value or a third superimposed voltage command computed based on the maximum value and the minimum value, and a second selector that selectively outputs, based on a frequency the power output means outputs, a zero superimposed voltage command that makes the superimposed voltage command zero or the selected superimposed voltage command.

14. An electric power steering controller, comprising:
a three-phase voltage command computing means for computing three-phase voltage commands so that a three-phase AC rotary machine produces torque that assists steering torque from a steering system; and
a power inverter according to claim 1 for outputting, based on the three-phase voltage commands, the three-phase voltages to the three-phase AC rotary machine.

15. A power inverter that converts based on three-phase voltage commands a DC voltage into three-phase voltages and outputs the voltages, the power inverter comprising:
a superimposed voltage command computing means for computing and outputting a superimposed voltage command using a difference between a maximum value and a minimum value of the three-phase voltage commands;
a voltage command modification means for adding the superimposed voltage command to each of the three-phase voltage commands and outputting modified three-phase voltage commands; and
a power output means for outputting the three-phase voltages based on the modified three-phase voltage commands; wherein
the superimposed voltage command computing means obtains a superimposition coefficient that varies continuously with respect to a frequency the power output means outputs, and computes the superimposed voltage command by performing multiplication by the superimposition coefficient.

* * * * *